United States Patent
Park et al.

(10) Patent No.: US 10,191,324 B2
(45) Date of Patent: Jan. 29, 2019

(54) REFLECTIVE LIQUID CRYSTAL DISPLAY DEVICE

(71) Applicant: SAMSUNG DISPLAY CO., LTD., Yongin-si, Gyeonggi-do (KR)

(72) Inventors: Seunghyun Park, Seoul (KR); Sungin Ro, Hwaseong-si (KR); Junho Song, Seongnam-si (KR); Jaehak Lee, Suwon-si (KR)

(73) Assignee: SAMSUNG DISPLAY CO., LTD., Yongin-si, Gyeonggi-do (KR)

( * ) Notice: Subject to any disclaimer, the term of this patent is extended or adjusted under 35 U.S.C. 154(b) by 0 days.

(21) Appl. No.: 15/480,547

(22) Filed: Apr. 6, 2017

(65) Prior Publication Data

US 2018/0004037 A1 Jan. 4, 2018

(30) Foreign Application Priority Data

Jun. 30, 2016 (KR) .................. 10-2016-0082532

(51) Int. Cl.
*G02F 1/1335* (2006.01)
*G02F 1/1362* (2006.01)
*G02F 1/1368* (2006.01)

(52) U.S. Cl.
CPC .. *G02F 1/133553* (2013.01); *G02F 1/133555* (2013.01); *G02F 1/136286* (2013.01); *G02F 1/1368* (2013.01); *G02F 2001/136222* (2013.01); *G02F 2201/123* (2013.01)

(58) Field of Classification Search
CPC ......... G02F 1/133553; G02F 1/133555; G02F 1/136286; G02F 1/1368; G02F 2001/136222; G02F 2201/123
See application file for complete search history.

(56) References Cited

U.S. PATENT DOCUMENTS

| | | |
|---|---|---|
| 8,259,260 B2 | 9/2012 | Kim et al. |
| 9,348,172 B2 | 5/2016 | Fukunaga et al. |
| 2007/0013839 A1* | 1/2007 | Rho ........................ G02B 5/201 349/114 |
| 2015/0002953 A1 | 1/2015 | Yoon |
| 2015/0108471 A1* | 4/2015 | Nakada ............... H01L 27/1255 257/43 |

FOREIGN PATENT DOCUMENTS

| | | |
|---|---|---|
| KR | 10-2001-0058191 A | 7/2001 |
| KR | 10-2003-0049987 A | 6/2003 |
| KR | 10-2011-0062993 A | 6/2011 |
| KR | 10-2015-0002486 A | 1/2015 |
| KR | 10-2015-0003466 A | 1/2015 |

* cited by examiner

*Primary Examiner* — Nathanael R Briggs
(74) *Attorney, Agent, or Firm* — Lee & Morse, P.C.

(57) ABSTRACT

A liquid crystal display device includes a first substrate opposing a second substrate, a reflection layer on the first substrate, a color filter layer on the reflection layer, and a pixel electrode on the color filter layer. The color filter layer includes a first color filter adjacent to a second color filter. The reflection layer includes a slit portion overlapping an edge portion between the first color filter and the second color filter.

22 Claims, 29 Drawing Sheets

REFLECTIVE LIQUID CRYSTAL DISPLAY DEVICE

CROSS-REFERENCE TO RELATED APPLICATION

Korean Patent Application No. 10-2016-0082532, filed on Jun. 30, 2016, and entitled "Reflective Liquid Crystal Display Device," is incorporated by reference herein in its entirety.

BACKGROUND

1. Field

One or more embodiments relate to a reflective liquid crystal display device.

2. Description of the Related Art

A variety of displays have been developed. Examples include liquid crystal displays (LCDs), plasma displays, electroluminescence displays, and organic light emitting diode displays. An LCD adjusts the alignment of liquid crystals in a liquid crystal layer. As a result, transmittance of light from a backlight assembly is controlled to form an image. The backlight assembly is thick and heavy and consumes a large amount of power.

Another type of LCD, know as a reflective LCD, adjusts light transmittance by reflecting natural light or external artificial light to display an image. A reflective LCD device may therefore be thin and consume less power compared to transmissive LCDs.

SUMMARY

In accordance with one or more embodiments, a liquid crystal display device includes a first substrate opposing a second substrate; a reflection layer on the first substrate; a color filter layer on the reflection layer; and a pixel electrode on the color filter layer, wherein the color filter layer includes a first color filter and a second color filter adjacent to the first color filter, and wherein the reflection layer includes a slit portion overlapping an edge portion between the first and second color filters.

The device may include a data line on the first substrate, and the data line may not overlap the slit portion. The device may include a gate line on the first substrate and intersecting the data line, and the gate line may not overlap the slit portion. The slit portion may include a first slit portion along the data line and adjacent to the data line and a second slit portion along the gate line and adjacent to the gate line.

The device may include a light blocking layer on the second slit portion. The light blocking layer may not overlap the first slit portion. The data line may overlap the reflection layer. The reflection layer may be insulated from the pixel electrode. The reflection layer may be connected to a terminal having a predetermined electric potential. The reflection layer may be connected to a reference terminal.

The device may include a data line on the first substrate, wherein the reflection layer is spaced apart from the data line and on a same layer as the data line. The reflection layer may include a same material as the data line. The reflection layer may have an island-shaped pattern. The reflection layer may be electrically connected to the pixel electrode.

The device may include a storage electrode on a different layer from the reflection layer, wherein the storage electrode is between the reflection layer and the data line. The device may include a light blocking layer corresponding to the reflection layer, the data line, and the storage electrode. The reflection layer may have a linear pattern extending along and spaced apart from the data line. Each of the first color filter and the second color filter may have a linear pattern extending along the data line.

In accordance with one or more other embodiments, a liquid crystal display device includes a first substrate opposing a second substrate; a data line on the first substrate; a gate line on the first substrate and intersecting the data line; a reflection layer on the data line and the gate line, the reflection layer including a first slit portion parallel to the data line; a color filter layer on the reflection layer; and a pixel electrode on the color filter layer, wherein the color filter layer includes a first color filter and a second color filter adjacent to the first color filter and wherein an edge portion between the first color filter and the second color filter overlaps the first slit portion. The reflection layer may be insulated from the pixel electrode.

In accordance with one or more other embodiments, a liquid crystal display device includes a first substrate opposing a second substrate; a data line on the first substrate and extending along a first direction; a gate line on the first substrate and extending along a second direction which intersects the first direction; a reflection layer on a same layer as the data line and spaced apart from the data line; a color filter layer on the reflection layer and the data line; and a pixel electrode on the color filter layer, wherein the color filter layer includes a first color filter and a second color filter adjacent to the first color filter, and wherein an edge portion between the first color filter and the second color filter is between the reflection layer and the data line.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
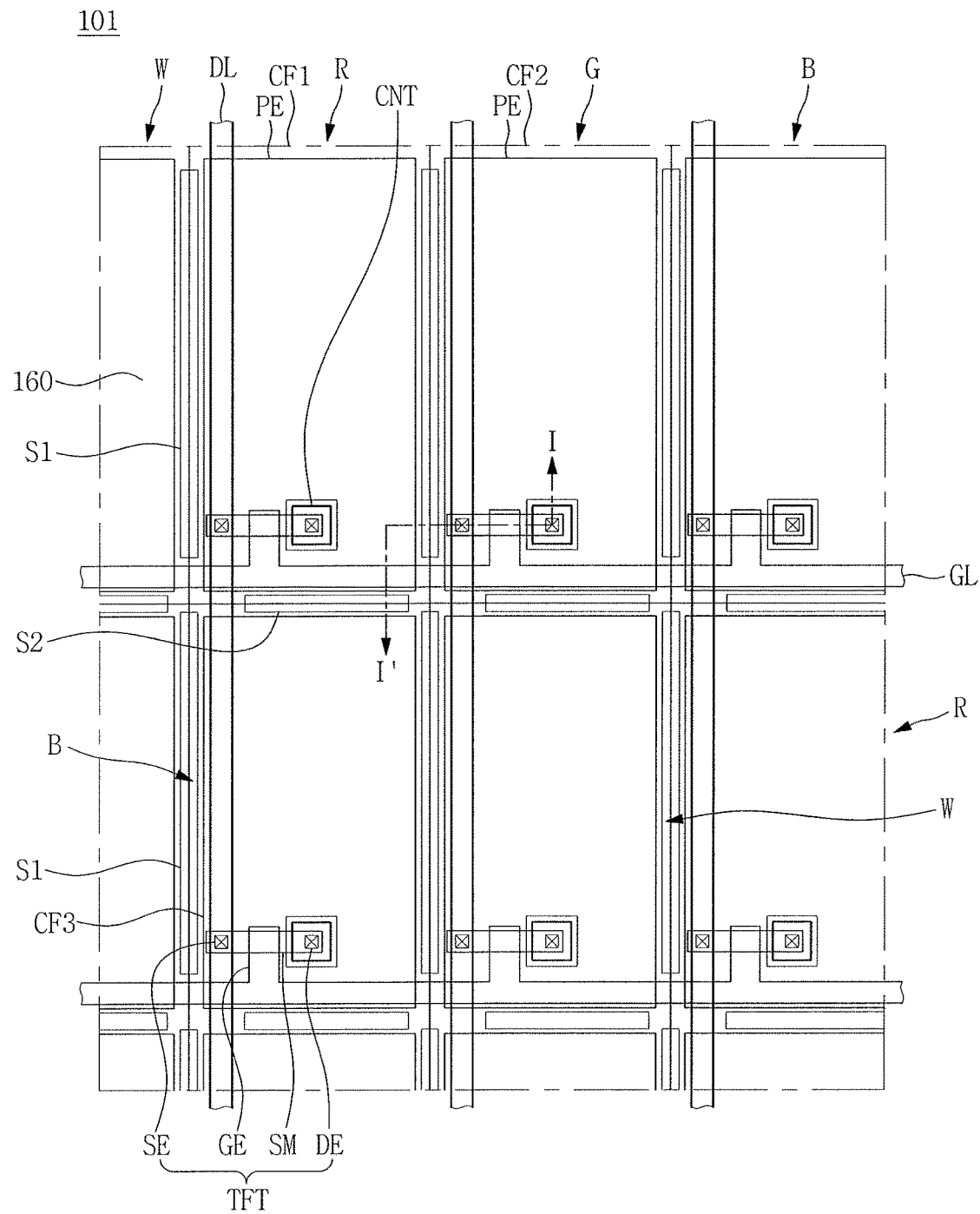
FIG. 1 illustrates an embodiment of a liquid crystal display (LCD) device.

Example embodiments will be described with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments (or portions thereof) may be combined to form additional embodiments.

In the drawings, the dimensions of layers and regions may be exaggerated for clarity of illustration. When a layer, area, or plate is referred to as being "on" another layer, area, or plate, it may be directly on the other layer, area, or plate, or intervening layers, areas, or plates may be present therebetween. Conversely, when a layer, area, or plate is referred to as being "directly on" another layer, area, or plate, intervening layers, areas, or plates may be not including therebetween. Further when a layer, area, or plate is referred to as being "below" another layer, area, or plate, it may be directly below the other layer, area, or plate, or intervening layers, areas, or plates may be present therebetween. Conversely, when a layer, area, or plate is referred to as being "directly below" another layer, area, or plate, intervening layers, areas, or plates may be not including therebetween.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Figure 2A:
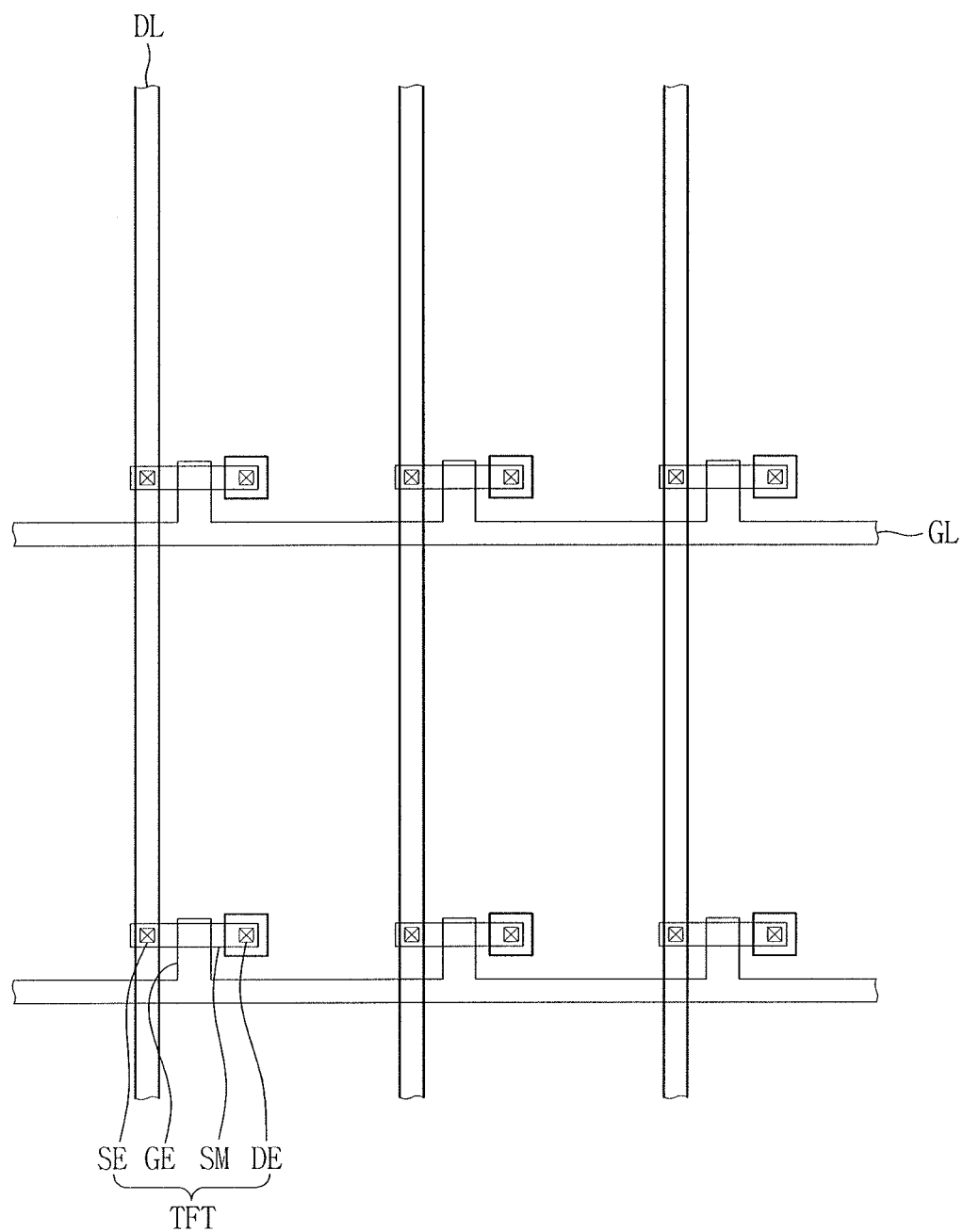
FIG. 2A illustrates an embodiment of a wiring unit.
Figure 2B:
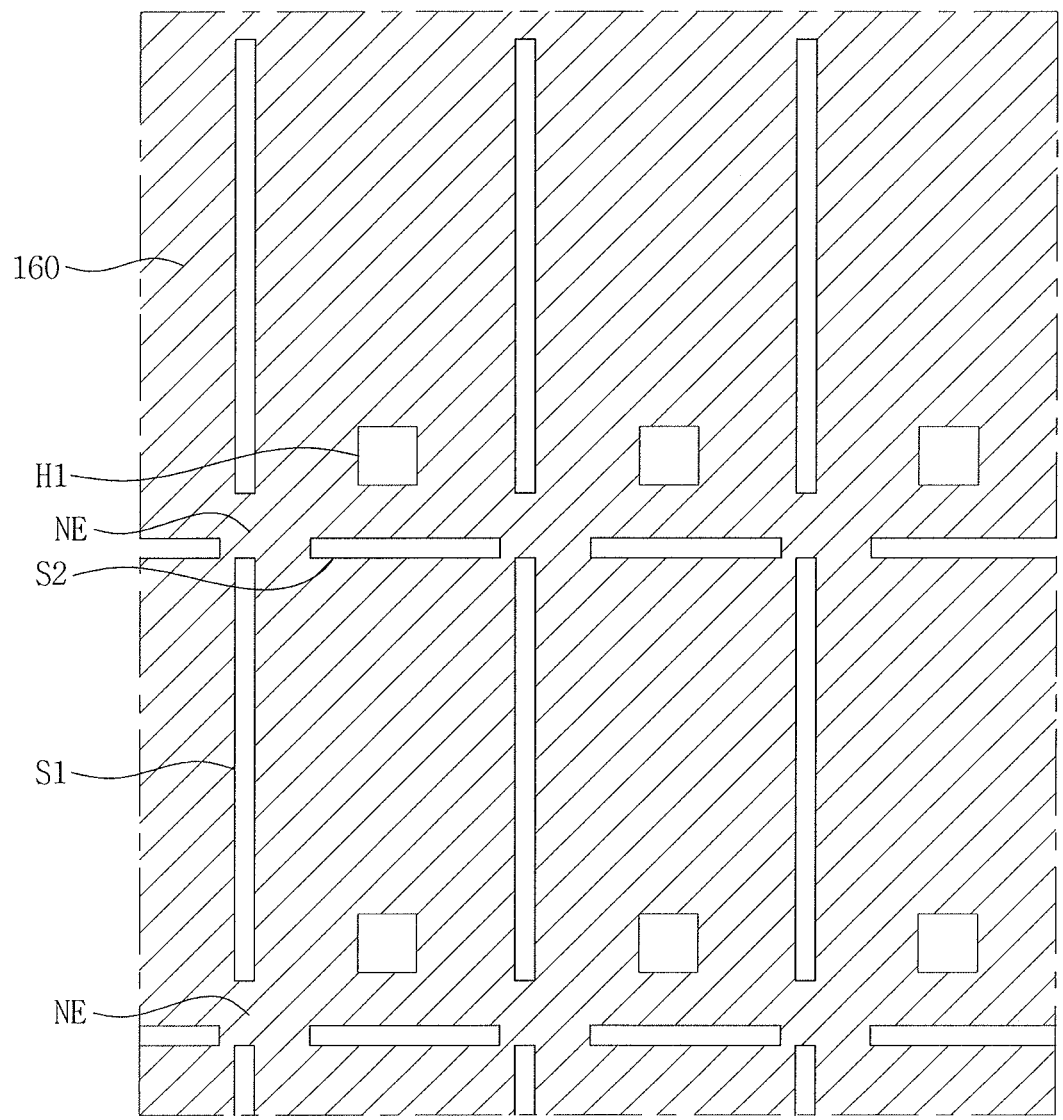
FIG. 2B illustrates an embodiment of a reflection layer.
Figure 2C:
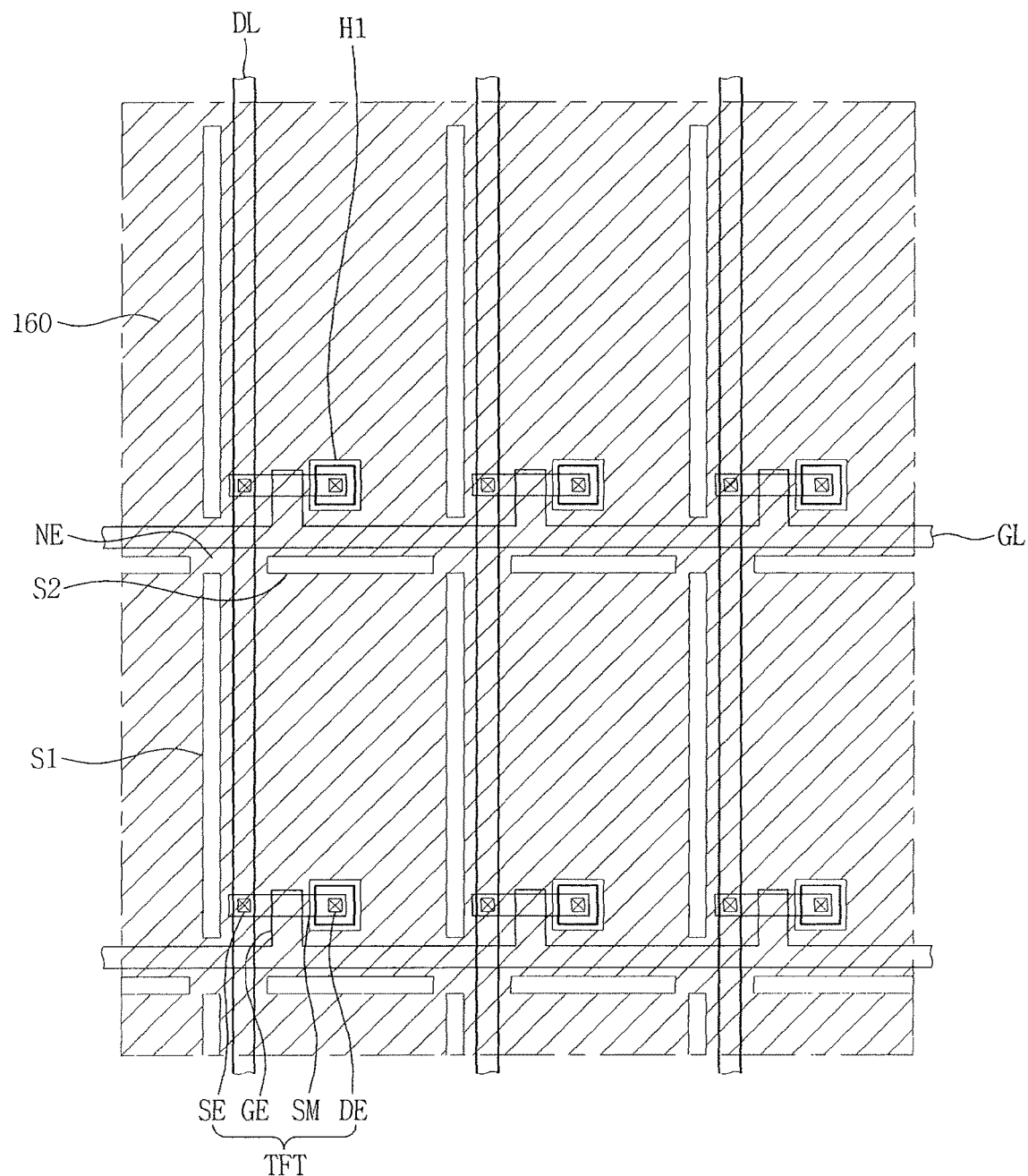
FIG. 2C illustrates an embodiment of the reflection layer and the wiring unit.
Figure 2D:
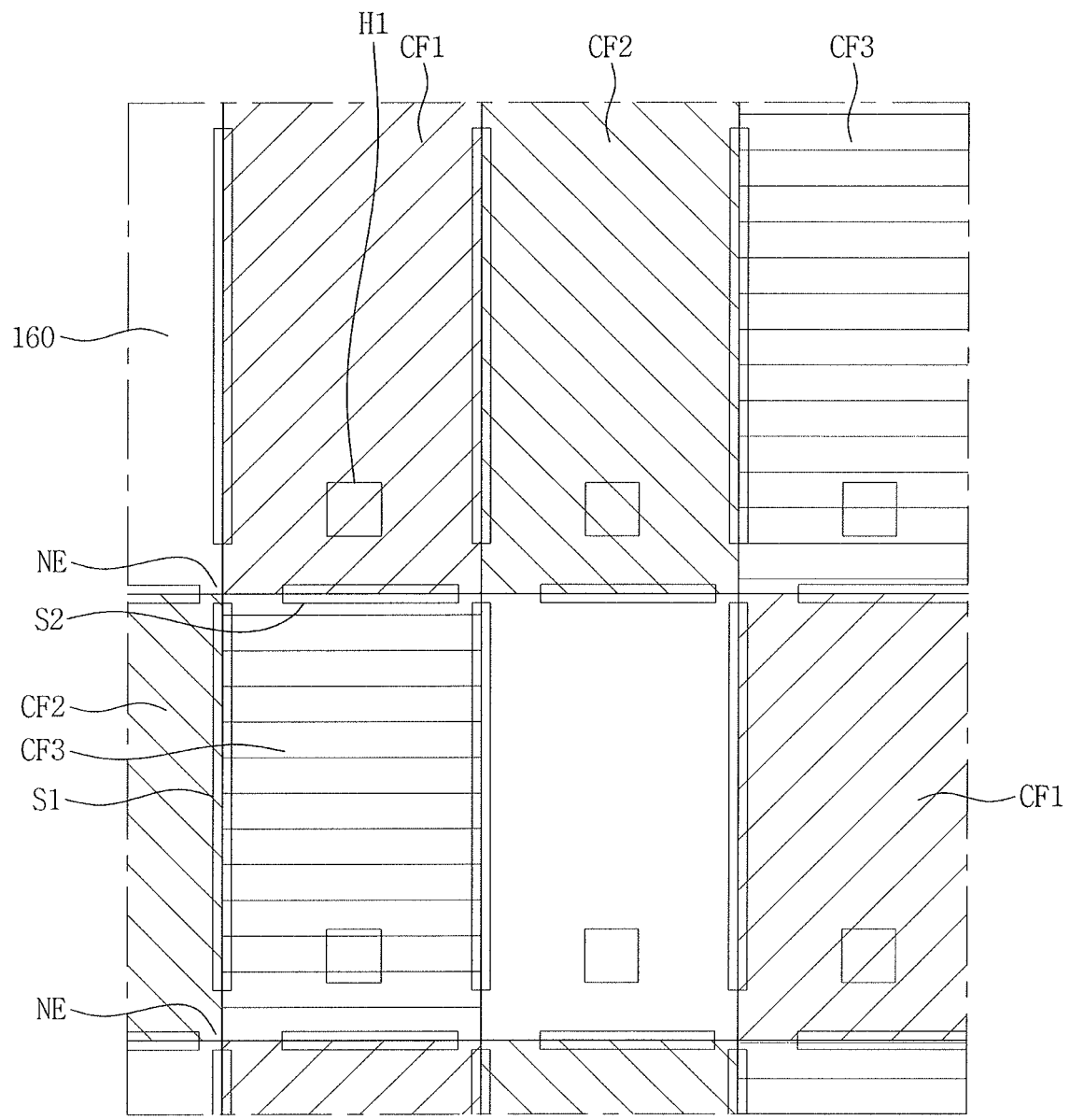
FIG. 2D illustrates an embodiment of the reflection layer and a color filter.
Figure 2E:
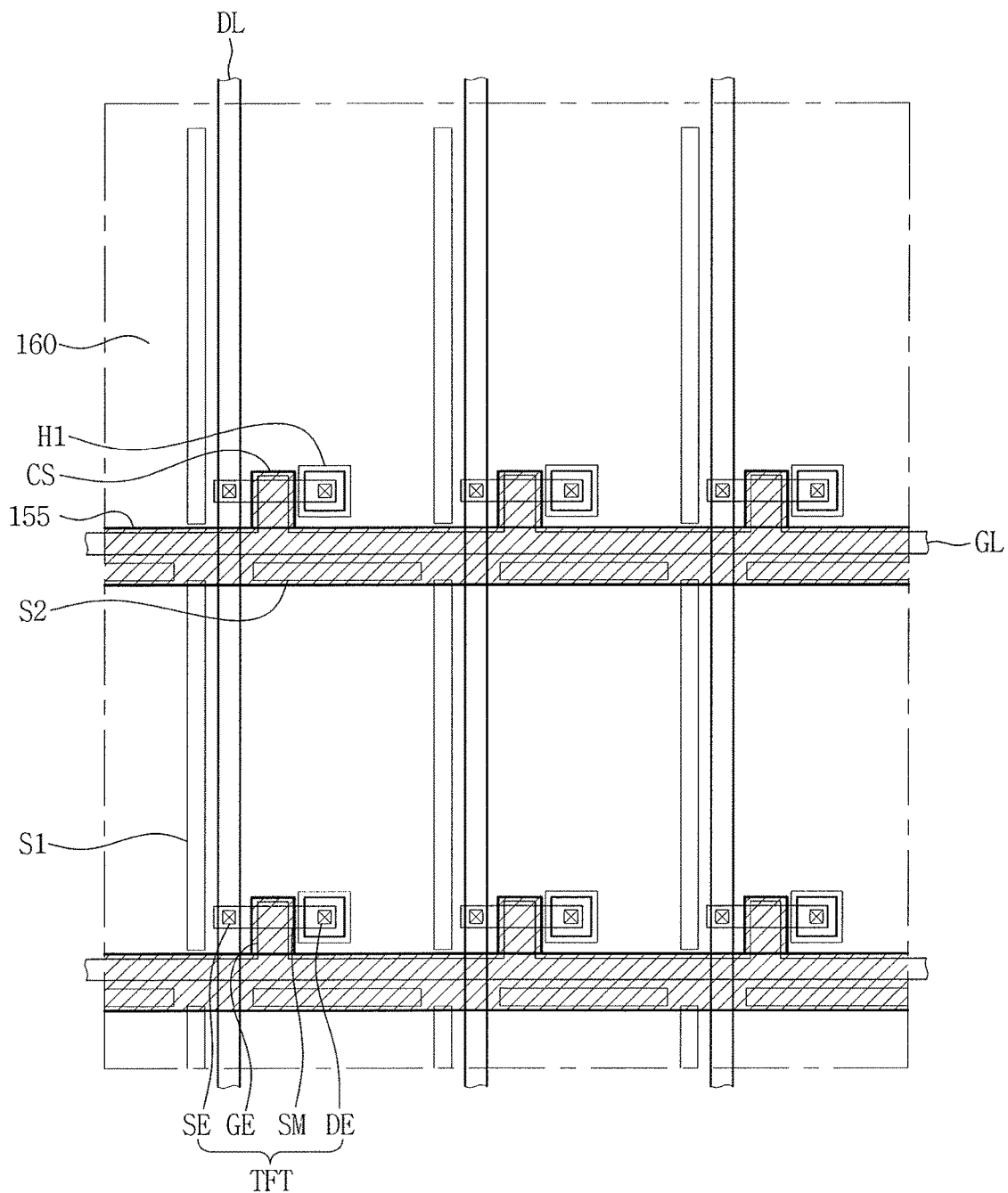
FIG. 2E illustrates an embodiment of a light blocking layer and a column spacer.
Figure 3:
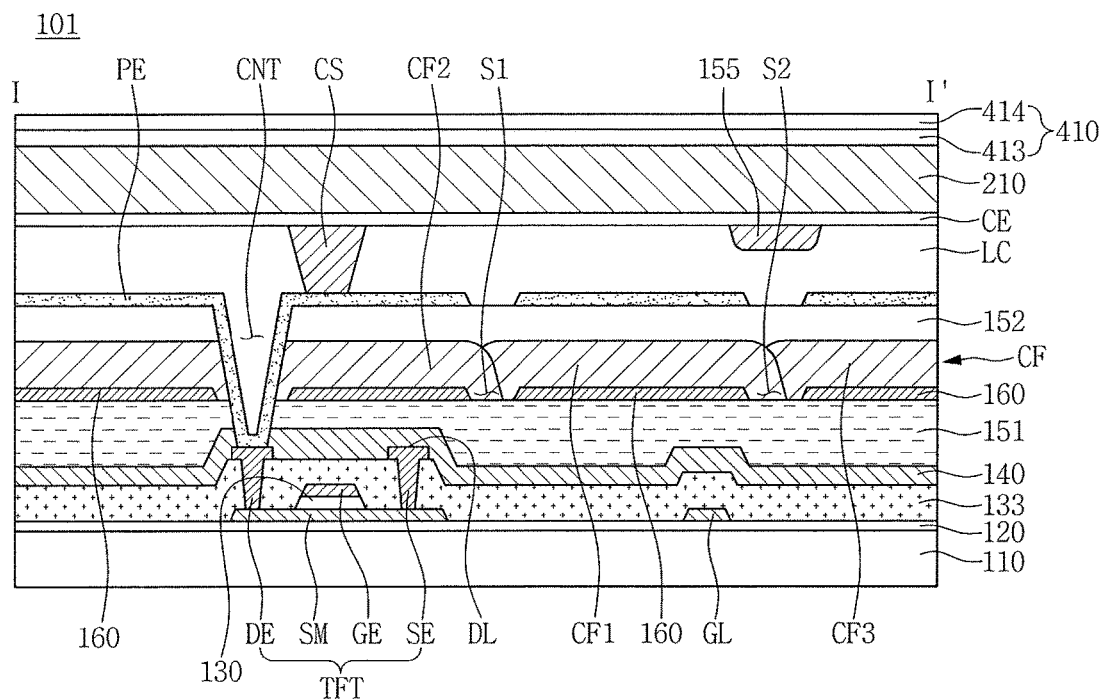
FIG. 3 illustrates a cross-sectional view taken along line I-I' in FIG. 1.

FIG. 1 illustrates an embodiment of a liquid crystal display (LCD) device 101. FIG. 2A is a plan view illustrating an embodiment of a wiring unit of FIG. 1. FIG. 2B is a plan view illustrating an embodiment of a reflection layer of FIG. 1. FIG. 2C is a plan view illustrating an embodiment of a disposition of the reflection layer and the wiring unit of FIG. 1. FIG. 2D is a plan view illustrating an embodiment of a disposition of the reflection layer and a color filter of FIG. 1. FIG. 2E is a plan view illustrating an embodiment of a disposition of a light blocking layer and a column spacer. FIG. 3 is a cross-sectional view taken along line I-I' in FIG. 1.

The LCD device 101 includes a first substrate 110, a second substrate 210 opposing the first substrate 110, a liquid crystal layer LC between the first substrate 110 and the second substrate 210, and a polarization plate 410 on the second substrate 210.

The first substrate 110 may include an insulating material including, for example, glass, quartz, ceramic, and plastic. A buffer layer 120 may be on the first substrate 110. The buffer layer 120 may include at least one of inorganic layers or organic layers. In one embodiment, the buffer layer 120 may be omitted.

A semiconductor layer SM is on the buffer layer 120. The semiconductor layer SM may include, for example, amorphous silicon or crystalline silicon. In addition, the semiconductor layer SM may include an oxide semiconductor material.

A gate insulating layer 130 is on the semiconductor layer SM. A gate electrode GE is on the gate insulating layer 130. The gate insulating layer 130 may be over an entire surface of the first substrate 110 or may be disposed only in an area overlapping the gate electrode GE. In FIG. 3, the gate insulating layer 130 is only in an area overlapping the gate electrode GE. The gate electrode GE extends from a gate line GL.

An insulating interlayer 133 is on the gate electrode GE. The insulating interlayer 133 may include an organic layer or an inorganic layer having insulating properties.

A source electrode SE and a drain electrode DE are on the insulating interlayer 133. The source electrode SE and the drain electrode DE are spaced apart from each other. Each of the source electrode SE and the drain electrode DE overlaps a portion of the semiconductor layer SM. Each of the source electrode SE and the drain electrode DE are connected to the semiconductor layer SM through a contact hole in the insulating interlayer 133.

Referring to FIGS. 1 and 2A, a portion of a data line DL corresponds to the source electrode SE. The drain electrode DE is electrically connected to the pixel electrode PE through a contact hole CNT. (The data line DL intersects the gate line GL. The direction in which the data line DL extends may be referred to as a first direction. The direction in which the gate line GL extends may be referred to as a second direction. Referring to FIG. 1, the first direction is a longitudinal direction and the second direction is a transverse direction.)

The gate electrode GE, the semiconductor layer SM, the source electrode SE, and the drain electrode DE collectively define a thin film transistor (TFT). The TFT in FIGS. 1 and 3 has a top-gate structure. In another embodiment, the TFT may have a bottom-gate structure. A portion including the gate line GL, the data line DL, and the TFT may be referred to as a wiring unit. The wiring unit drives pixels, and thus may also be referred to as a driving unit. An embodiment of the wiring unit is in FIG. 2A.

A passivation layer 140 is on the source electrode SE and the drain electrode DE. The passivation layer 140 protects the wiring unit.

A first protection layer 151 is on the passivation layer 140. The first protection layer 151 may be a monolayer or a multilayer that includes an organic layer or an inorganic layer. In one embodiment, the first protection layer 151 may be an organic layer. In one embodiment, the passivation layer 140 or the first protection layer 151 may be omitted.

A reflection layer 160 is on the first protection layer 151. The reflection layer 160 is in an area overlapping at least a portion of the pixel electrode PE. The reflection layer 160 may include metal, e.g., aluminum (Ag) or silver (Ag). The data line DL may overlap the reflection layer 160. In addition, the gate line GL may overlap the reflection layer 160 (e.g., refer to FIG. 2C).

The reflection layer 160 is insulated from the TFT. For example, the reflection layer 160 may be provided in an area except an area of the contact hole CNT. Referring to FIG. 2B, the reflection layer 160 includes an opening hole H1. The opening hole H1 may correspond to the contact hole CNT (e.g., refer to FIG. 3).

Referring to FIGS. 1 and 2B, the reflection layer 160 has slit portions S1 and S2, (e.g., a first slit portion S1 and a second slit portion S2. The slit portions S1 and S2 do not overlap the data line DL and do not overlap the gate line GL. For example, the first slit portion S1 may be parallel to the data line DL and adjacent to the data line DL. The second slit portion S2 may be parallel and adjacent to gate line GL. An area defined by two first slit portions S1 and two second slit portions S2 may correspond to an aperture of a pixel R, G, B, and W.

The reflection layer 160 includes a connecting portion NE between the slit portions S1 and S2. Due to the connecting portion NE, voltage may be applied uniformly across the entire portion of the reflection layer 160.

A color filter layer CF is on the reflection layer 160. The color filter layer CF may include a first color filter CF1, a second color filter CF2, and a third color filter CF3 of different colors. In one embodiment, the first color filter CF1 is a red color filter and corresponds to a red pixel R. The second color CF2 is a green color filter and corresponds to a green pixel G. The third color filter CF is a blue color filter and corresponds to a blue pixel B.

In one embodiment, the LCD device 101 includes a white pixel W. In this case, a color filter may be absent above a portion of the reflection layer 160 corresponding to the white pixel W. In one embodiment, a white color filter may be in the white pixel W. The color filters CF1, CF2, and CF3 may not overlap the area of the contact hole CNT.

The slit portions S1 and S2 in the reflection layer 160 overlap an edge portion between two different color filters. A portion at which two different color filters meet each other may be referred to as an edge portion. The two color filters may overlap each other or be spaced apart from each other at the edge portion. For example, referring to FIG. 2D, an edge portion between the first color filter CF1 and the second color filter CF2 is above the first slit portion S1, and an edge portion between the second color filter CF2 and the third color filter CF3 is above the first slit portion S1. An edge portion between the first color filter CF1 and the third color filter CF3 is above the second slit portion S2.

The LCD device 101 is a reflective-type LCD which does not include a backlight. In this device, light reflection does not occur in a portion which does not include a reflective medium. Referring to FIG. 2D, because the edge portion between two color filters overlaps the slit portion (e.g., the first and second slit portions S1 and S2), light reflection does not occur at the edge portion between the two color filters. Accordingly, the edge portion between the two color filters assumes a black state and thus color mixture of light does not occur at the edge portion.

Figure 4:
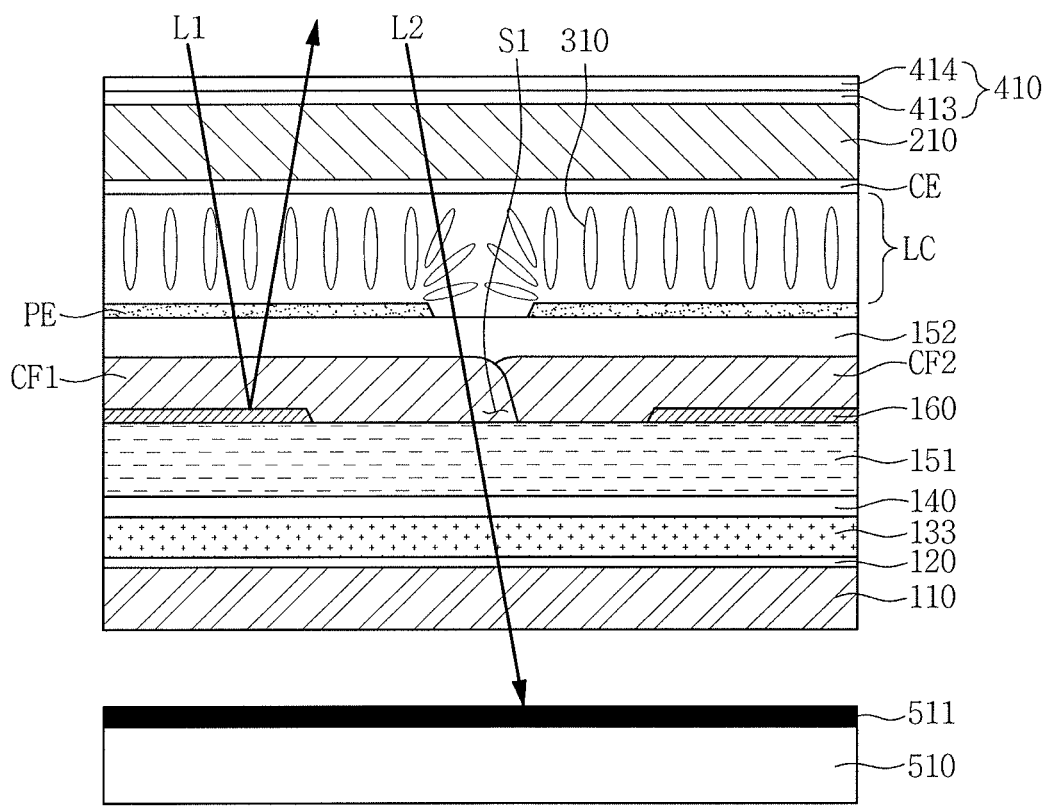
FIG. 4 illustrates an embodiment of a light path at an edge of a color filter.

FIG. 4 is a cross-sectional view illustrating an embodiment of a light path at the edge portion of the color filter. Referring to FIG. 4, light L1 incident on the reflection layer 160 is reflected from the reflection layer 160 and transmitted through the color filter (e.g., the first color filter CF1 or second color filter CF2) and externally emitted. However, light L2 incident on an edge portion between two color filters (e.g., the first color filter CF1 and the second color filter CF2) is not reflected because the edge portion does not include the reflection layer 160. When a chassis 510 is below the first substrate 110 and a black coating 511 is on the chassis 510, light incident on the first slit portion S1, corresponding to the edge portion between the two color filters CF1 and CF2, is absorbed by the black coating 511 and is not emitted externally.

Because light reflection does not occur at the edge portion between the two color filters CF1 and CF2, color mixture may be effectively reduced (or prevented), even though the light blocking layer 155 is not disposed along the edge portion between the color filters CF1 and CF2. When light blocking layer 155 is not provided, LCD device 101 may have an excellent aperture ratio and may display a high resolution image.

A second protection layer 152 is on the color filter layer CF. The second protection layer 152 may be a monolayer or a multilayer that includes an organic layer or an inorganic layer. The second protection layer 152 may include substantially a same material as the first protection layer 151. A portion of the first protection layer 151 and the second protection layer 152 is removed to allow a portion of the drain electrode DE to be exposed through the contact hole CNT.

The pixel electrode PE is on the second protection layer 152. The pixel electrode PE overlaps the reflection layer 160 in a respective pixel. The pixel electrode PE is electrically connected to the drain electrode DE through the contact hole CNT. The pixel electrode PE may include, for example, a transparent conductive oxide (TCO), e.g., indium tin oxide (ITO), indium zinc oxide (IZO), and aluminum zinc oxide (AZO).

Because the pixel electrode PE overlaps the reflection layer 160, when an electric potential of the reflection layer 160 varies, an electric potential of the pixel electrode PE may also vary due to coupling with the reflection layer 160. For example, when the electric potential of the reflection layer 160 is unstable, a ripple may occur in the electric potential of the pixel electrode PE. The ripple may cause flickering of a display screen.

According to the present embodiment, the reflection layer 160 is insulated from the pixel electrode PE and, for example, may be connected to a terminal having a predetermined electric potential. For example, the reflection layer 160 may be connected to a ground or other reference terminal. In one embodiment, the reflection layer 160 may be connected to another terminal having a predetermined electric potential.

A second substrate 210 opposes the first substrate 110, and the liquid crystal layer LC is between the first substrate 110 and the second substrate 210. A common electrode CE is on the second substrate 210 and opposes the pixel electrode PE. The common electrode may include, for example, a TCO, e.g., ITO, IZO, and AZO.

A column spacer CS supports the first substrate 110 and the second substrate 210 and is located between the first substrate 110 and the second substrate 210. A gap (e.g., a cell gap) between the pixel electrode PE and the common electrode CE may be uniformly maintained by the column spacer CS.

A light blocking layer 155 may be on the second substrate 210. The light blocking layer 155 may be, for example, a black matrix disposed on the common electrode CE of the second substrate 210. The light blocking layer 155 and the column spacer CS may have a unitary construction in one embodiment.

FIG. 2E is a plan view illustrating an embodiment of a disposition of the light blocking layer 155 and the column spacer CS. Referring to FIG. 2E, the light blocking layer 155 may be on the gate line GL and the second slit portion S2. However, the light blocking layer 155 does not overlap the first slit portion S1.

Because there is no issue of color mixture that may occur due to overlap of the color filters CF1, CF2, and CF3, each pixel may be well distinguished even though the light blocking layer 155 has a small width. Such an LCD device 101, which has the light blocking layer 155 with a small width, has an excellent aperture ratio and may display an image of high resolution. In one embodiment, light blocking layer 155 may be omitted.

The column spacer CS may overlap the TFT. In one embodiment, column spacer CS may overlap the connecting portion NE of the reflection layer 160. A polarization plate 410 is on the second substrate 210 at a location opposite the common electrode CE.

The LCD device 101, therefore, is a reflective LCD device that displays an image using natural light or external light incident thereto. For example, natural light, or external light incident to the LCD device 101, is reflected from the reflection layer 160 and transmitted through the color filter layer CF and the liquid crystal layer LC. As a result, an image may be displayed. The polarization plate 410 controls the incident light or light reflected by the reflection layer 160 so that LCD device 101 displays an image.

In one embodiment, the polarization plate 410 includes a phase difference plate 413 on a linear polarizer 414. When the polarization plate 410 is attached to the second substrate 210, the phase difference plate 413 is more adjacent to the liquid crystal layer LC than the linear polarizer 414 is to the liquid crystal layer LC. The linear polarizer 414 linearly polarizes external light incident to the polarization plate 410.

The linear polarizer 414 may include a film, for example, formed by orienting dichroic dyes on a polyvinyl alcohol ("PVA")-based resin in an absorption manner. Examples of the PVA resin may include a monopolymer of vinyl acetic acid or a copolymer of vinyl acetic acid and another monomer.

The phase difference plate 413 is on a surface of the linear polarizer 414 in order to retard the phase of light. The phase difference plate 413 may convert linearly polarized light into circularly polarized light or may convert circularly polarized light into linearly polarized light. For example, light externally incident to the polarization plate 410 may be linearly polarized by the linear polarizer 414 and circularly polarized by the phase difference plate 413. The circularly-polarized external light is reflected in the LCD device 101, and then is transmitted through the polarization plate 410 once again and is either directed externally or fails to propagate through the polarization plate 410 and dissipated. The phase difference plate 413 may have, for example, a film shape.

In one embodiment, the phase difference plate 413 includes a quarter wave plate (QWP). A light control film (LCF) may be on a surface of the phase difference plate 413.

The LCF may have light directivity to control the path of external light or reflected light and diffuses the reflected light to improve light efficiency.

Figure 5A:
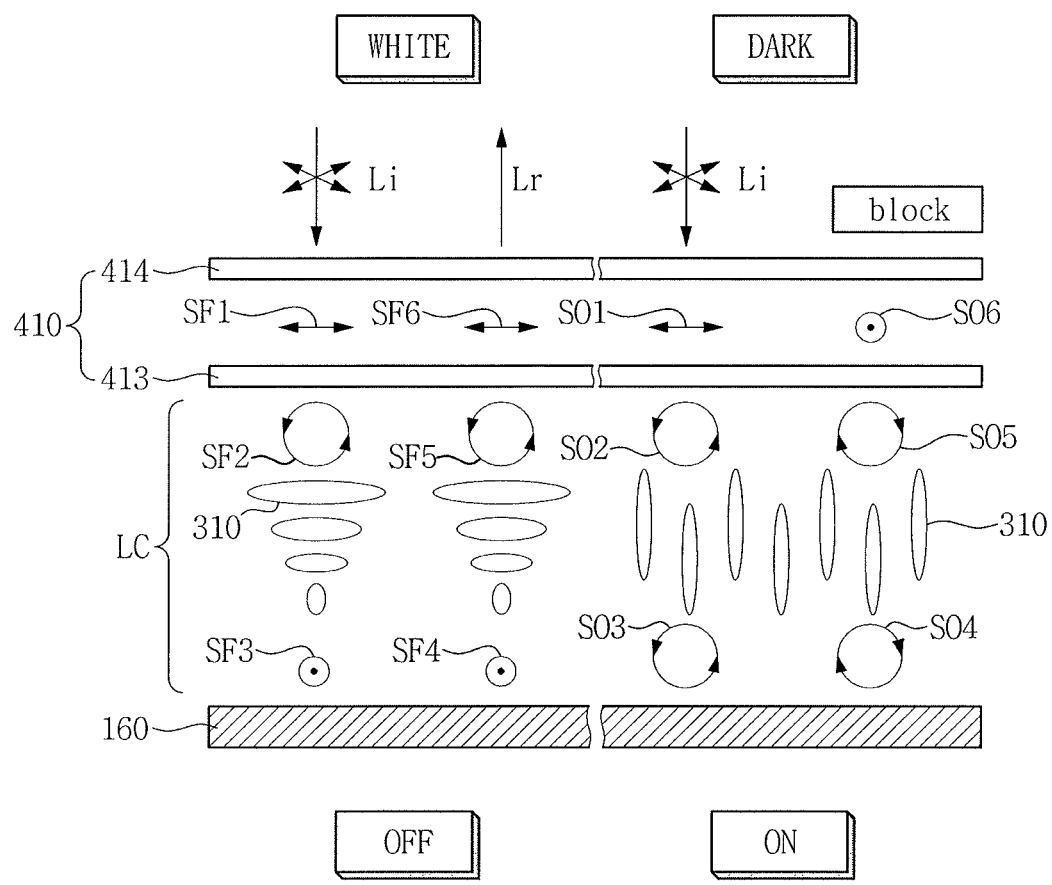
FIG. 5A illustrates an example of an optical driving principle of a reflective LCD device.
Figure 5B:
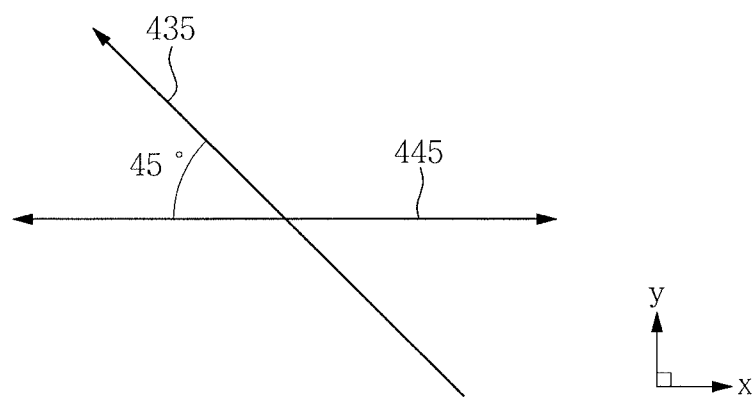
FIG. 5B illustrates an example of a relationship between a transmission axis of a linear polarizer and a slow axis of a phase difference plate.

FIG. 5A is a cross-sectional view illustrating an example of an optical driving principle of a reflective LCD device. FIG. 5B illustrates an example of a relationship between a transmission axis of the linear polarizer 414 and a slow axis of the phase difference plate 413. For example, FIG. 5A illustrates an example of an optical driving principle of the reflective LCD device 101 which includes the linear polarizer 414 and the phase difference plate 413 and is driven in a normal white mode. First, a principle (e.g., a left side) of displaying a white screen (e.g., a bright screen) will be described.

A propagation direction of light Li externally incident on the LCD device 101 corresponds to a z-axis. A left and right axis (represented by a bidirectional arrow) corresponds to an x-axis. An axis passing into and out of the page, or vise versa, (represented as a concentric circle (⊙) corresponds to a y-axis. The light Li externally incident in the z-axis direction is not polarized and vibrates on an xy-planar surface in a random manner. The light Li externally incident through the linear polarizer 414 may have a linearly polarized state SF1, and only has components that vibrate parallel to the x-axis (e.g., a transmission axis) due to the linear polarizer 414.

A slow axis 435 of the phase difference plate 413 may have an angle of about 45 degrees) (°) with respect to a transmission axis 445 of the linear polarizer 414. In an exemplary embodiment, the slow axis 435 of the phase difference plate 413 and the transmission axis 445 of the linear polarizer 414 may be aligned as in FIG. 5B. Accordingly, when light in the linearly polarized state SF1 is transmitted through the phase difference plate 413, a phase difference of about 90° occurs between respective components of the slow axis 435 and the transmission axis 445. Accordingly, the light transmitted through the phase difference plate 413 is in a circularly polarized state SF2, revolving in the counter-clockwise direction.

Liquid crystals 310 in an area not applied with a voltage (e.g., voltage-off state) are twisted, thereby imparting a phase difference of about 90° between x-axis components and y-axis components of the light transmitted through the liquid crystal layer LC. Accordingly, the light transmitted through the liquid crystal layer LC has a linearly polarized state SF3, only having components that vibrate in the y-axis direction.

After reflected from the reflection layer 160, the light in the linearly polarized state SF3 in the y-axis direction has a linearly polarized state SF4, still vibrating in the y-axis direction. When the light reflected from the reflection layer 160 is transmitted through the liquid crystal layer LC once again, the phase of the light is reversely shifted by about 90°, and the light has a circularly polarized state SF5 revolving in the counter-clockwise direction. Further, when the light is transmitted through the phase difference plate 413 once again, the phase of the light is shifted by about 90°, and the light has a linearly polarized state SF6, only having components that vibrate in the x-axis.

Because the transmission axis of the linear polarizer 414 is parallel to the x-axis direction, the light in the linearly polarized state SF6 in the x-axis direction is transmitted in tact through the linear polarizer 414 and provides a bright display area due to reflected light Lr. Accordingly, a bright screen (e.g., a white screen) is displayed in a steady state in which voltage is not applied.

An example of a principle for displaying a black screen (e.g, a dark screen) will now be described. When the characteristics of a light Li externally incident to the LCD device 101A to display the black screen is the same as those of the light Li incident to the LCD device 101A to display the white screen, the light Li incident on the polarization plate 410 is transmitted through the linear polarizer 414, transforms into a linearly polarized state S01, and is transmitted through the phase difference plate 413 and transforms into a circularly polarized state S02 revolving in the counter-clockwise direction. When a black screen is displayed, a voltage is applied to the pixel (e.g., voltage-on state) so that the liquid crystals 310 are not twisted and are parallely oriented. Also, the light propagating through the liquid crystal layer LC maintains a circularly polarized state S03 without experiencing a phase shift.

When the light is reflected from the reflection layer 160, the phase of the circularly polarized light is shifted so that the light reflected from the reflection layer 160 becomes orthogonal with respect to the light incident to the reflection layer 160. Thus, the light reflected from the reflection layer 160 has a circularly polarized state S04, revolving in the clockwise direction.

Because the light in the circularly polarized state S04 does not experience a phase shift when transmitted through the liquid crystal layer LC, the light transmitted through the liquid crystal layer LC maintains a circularly polarized state S05, revolving in the clockwise direction. The light in the circularly polarized state S05 in the clockwise direction experiences a 90° phase shift when transmitted through the phase difference plate 413 and transforms into a linearly polarized state S06 having only y-axis components that vibrate in the y-axis direction.

In such an exemplary embodiment, light in the linearly polarized state S06 (which only has y-axis components) may not be transmitted through the linear polarizer 414, and thus is blocked, because the linear polarizer 414 has a transmission axis in the x-axis direction. Accordingly, because the reflected light is blocked, a pixel applied with the voltage appears dark corresponding to a black screen.

Figure 6:
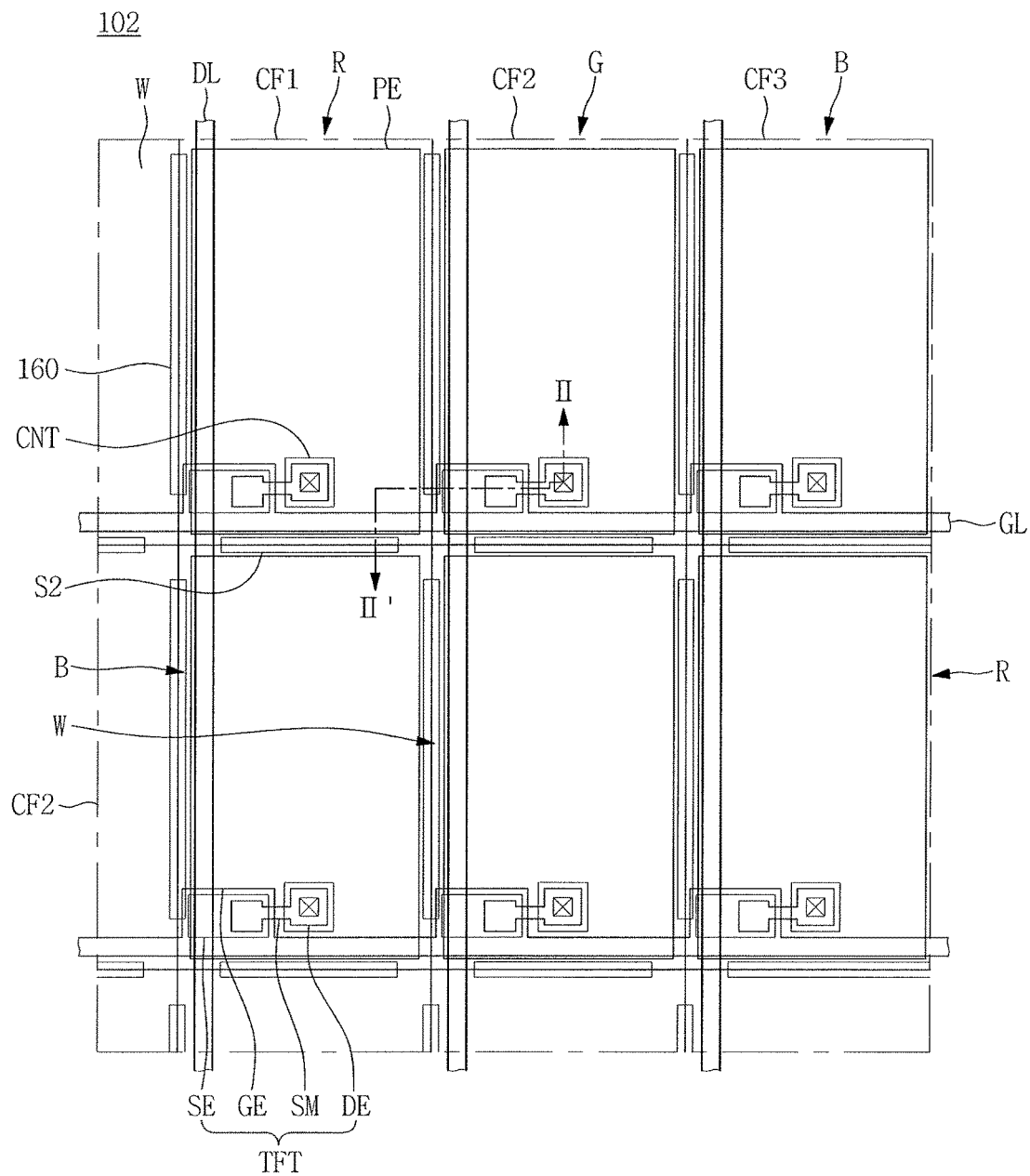
FIG. 6 illustrates another embodiment of an LCD device.
Figure 7A:
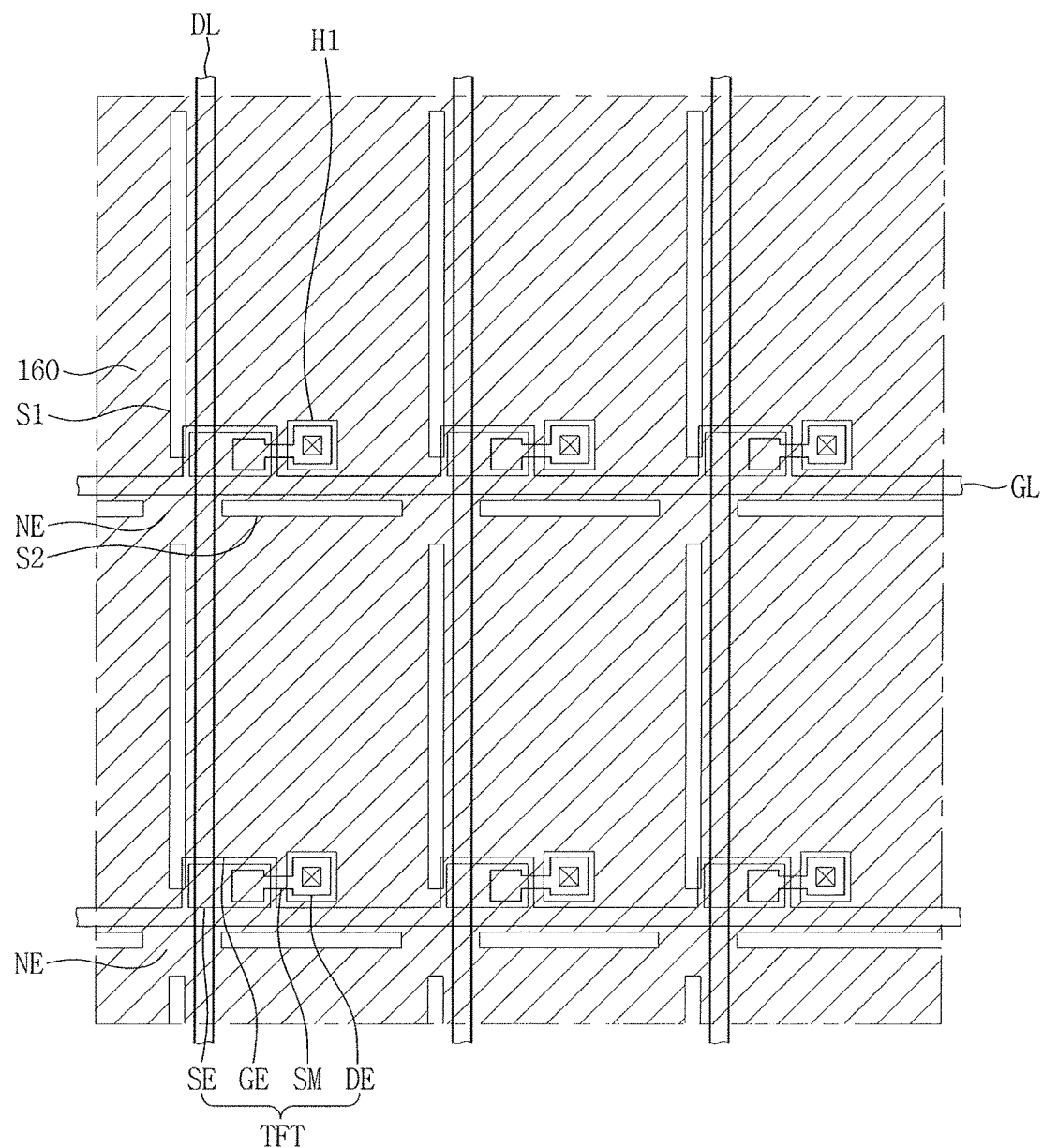
FIG. 7A illustrates an embodiment of a reflection layer and a wiring unit in FIG. 6.
Figure 7B:
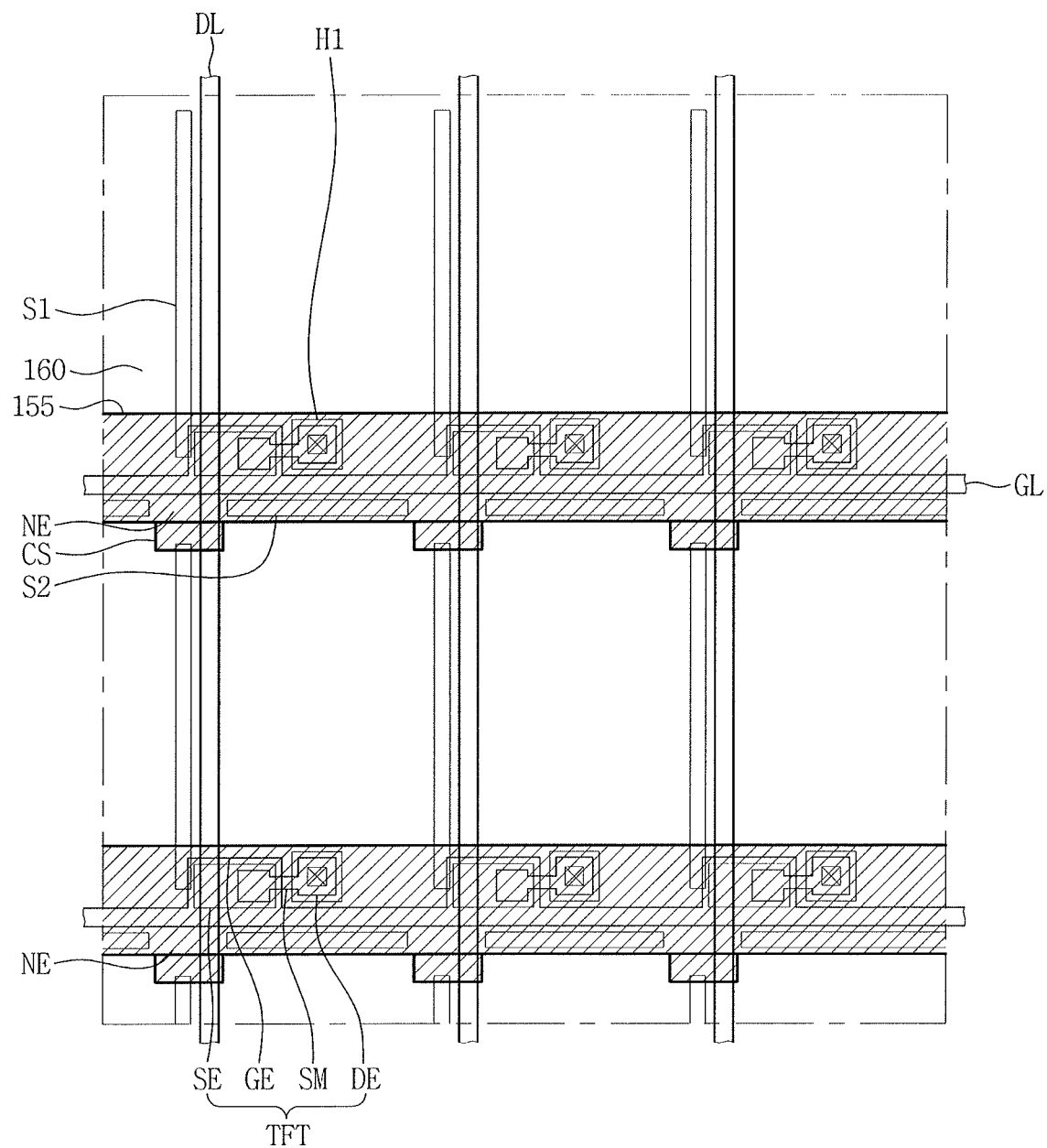
FIG. 7B illustrates an embodiment of a light blocking layer and a column spacer.
Figure 8:
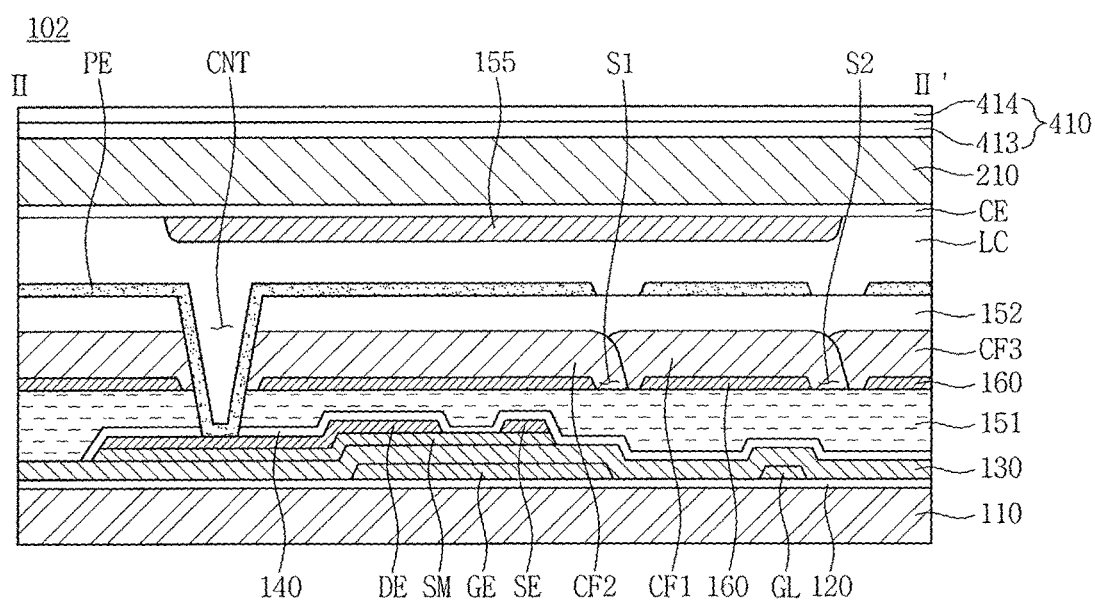
FIG. 8 illustrates a cross-sectional view taken along line II-II' in FIG. 6.

FIG. 6 is a plan view illustrating another embodiment of an LCD device 102. FIG. 7A is a plan view illustrating an embodiment of a disposition of a reflection layer and a wiring unit in FIG. 6, FIG. 7B is a plan view illustrating another embodiment of a disposition of a light blocking layer and a column spacer. FIG. 8 is a cross-sectional view taken along line II-II' in FIG. 6.

The LCD device 102 is a reflective LCD device which includes a first substrate 110, a second substrate 210 opposing the first substrate 110, and a liquid crystal layer LC between the first substrate 110 and the second substrate 210. A buffer layer 120 is on the first substrate 110. A gate electrode GE is on the buffer layer 120 and extends from a gate line GL. A gate insulating layer 130 is on the gate electrode GE and the gate line GL. A semiconductor layer SM is on the gate insulating layer 130. A source electrode SE and a drain electrode DE are on the semiconductor layer SM, overlapping at least a portion of the semiconductor layer SM, and are spaced apart from each other with a channel area therebetween.

Referring to FIGS. 6 and 7A, a portion of the data line DL corresponds to the source electrode SE. The drain electrode DE is electrically connected to a pixel electrode PE through a contact hole CNT. The gate electrode GE, the semiconductor layer SM, the source electrode SE, and the drain electrode DE collectively define a TFT. The TFT in FIGS. 6 and 8 has, for example, a bottom-gate structure.

A passivation layer 140 is on the source electrode SE and the drain electrode DE. A first protection layer 151 is on the passivation layer 140. In one embodiment, the passivation layer 140 or the first protection layer 151 may be omitted.

A reflection layer 160 is on first protection layer 151 and in an area overlapping at least a portion of the pixel electrode PE. The reflection layer 160 may include or be formed of metal. The data line DL and the gate line GL overlap the reflection layer 160, and the reflection layer 160 is insulated from the TFT. The reflection layer 160 is not in an area of the contact hole CNT.

In addition, the reflection layer 160 has slit portions, e.g., a first slit portion S1 and a second slit portion S2. The slit portions S1 and S2 do not overlap the data line DL and do not overlap the gate line GL. An area defined by two first slit portions S1 and two second slit portions S2 corresponds to an aperture of a pixel R, G, B, and W. The reflection layer 160 includes a connecting portion NE disposed among the slit portions S1 and S2.

A color filter layer CF is on the reflection layer 160 and may include a first color filter CF1, a second color filter CF2, and a third color filter CF3. The first color filter CF1, the second color filter CF2, and the third color filter CF3 have different colors. In one embodiment, the first color filter CF1 is a red color filter and corresponds to a red pixel R. The second color CF2 is a green color filter and corresponds to a green pixel G. The third color filter CF is a blue color filter and corresponds to a blue pixel B.

In one embodiment, the LCD device 102 includes a white pixel W. In one embodiment, a color filter may be absent above a portion of the reflection layer 160 corresponding to the white pixel W.

The slit portions S1 and S2 in the reflection layer 160 overlap an edge portion of two different color filters.

The LCD device 102 is a reflective-type LDC which does not include a backlight. Because an edge portion between two different color filters overlaps the slit portion (e.g., the first slit portion S1 and the second slit portion S2), light reflection does not occur at the edge portion between the two color filters. Accordingly, the edge portion between the two color filters may have a black state and color mixture does not occur at the edge portion due to overlap of the color filters.

A second protection layer 152 is on the color filter layer CF. A portion of the first protection layer 151, the color filter layer CF, and the second protection layer 152 is removed to allow the drain electrode to be exposed through the contact hole CNT.

The pixel electrode PE is on the second protection layer 152 and overlaps the reflection layer 160 in a respective pixel. The pixel electrode PE is electrically connected to the drain electrode DE through the contact hole CNT. The pixel electrode PE may include, for example, a TCO, e.g., ITO, IZO, and AZO.

The reflection layer 160 is insulated from the pixel electrode PE and may be connected to a terminal having a predetermined electric potential. For example, the reflection layer 160 may be connected to a ground terminal. The reflection layer 160 may be connected to another terminal having a predetermined electric potential.

A second substrate 210 opposes the first substrate 110, and the liquid crystal layer LC is between the first substrate 110 and the second substrate 210. A common electrode CE is on the second substrate 210.

A column spacer CS supporting the first substrate 110 and the second substrate 210 is between the first substrate 110 and the second substrate 210. A light blocking layer 155 is on the second substrate 210 and may be on the common electrode CE of the second substrate 210.

FIG. 7B is a plan view illustrating an embodiment of a disposition of the light blocking layer 155 and the column spacer CS in the LCD device 102. Referring to FIG. 7B, the light blocking layer 155 may be on the gate line GL, the TFT, and the second slit portion S2. In one embodiment, the light blocking layer 155 may be omitted. The column spacer CS overlaps the connecting portion NE of the reflection layer 160. The polarization plate 140 is on the second substrate 210 opposite to common electrode CE.

Figure 9:
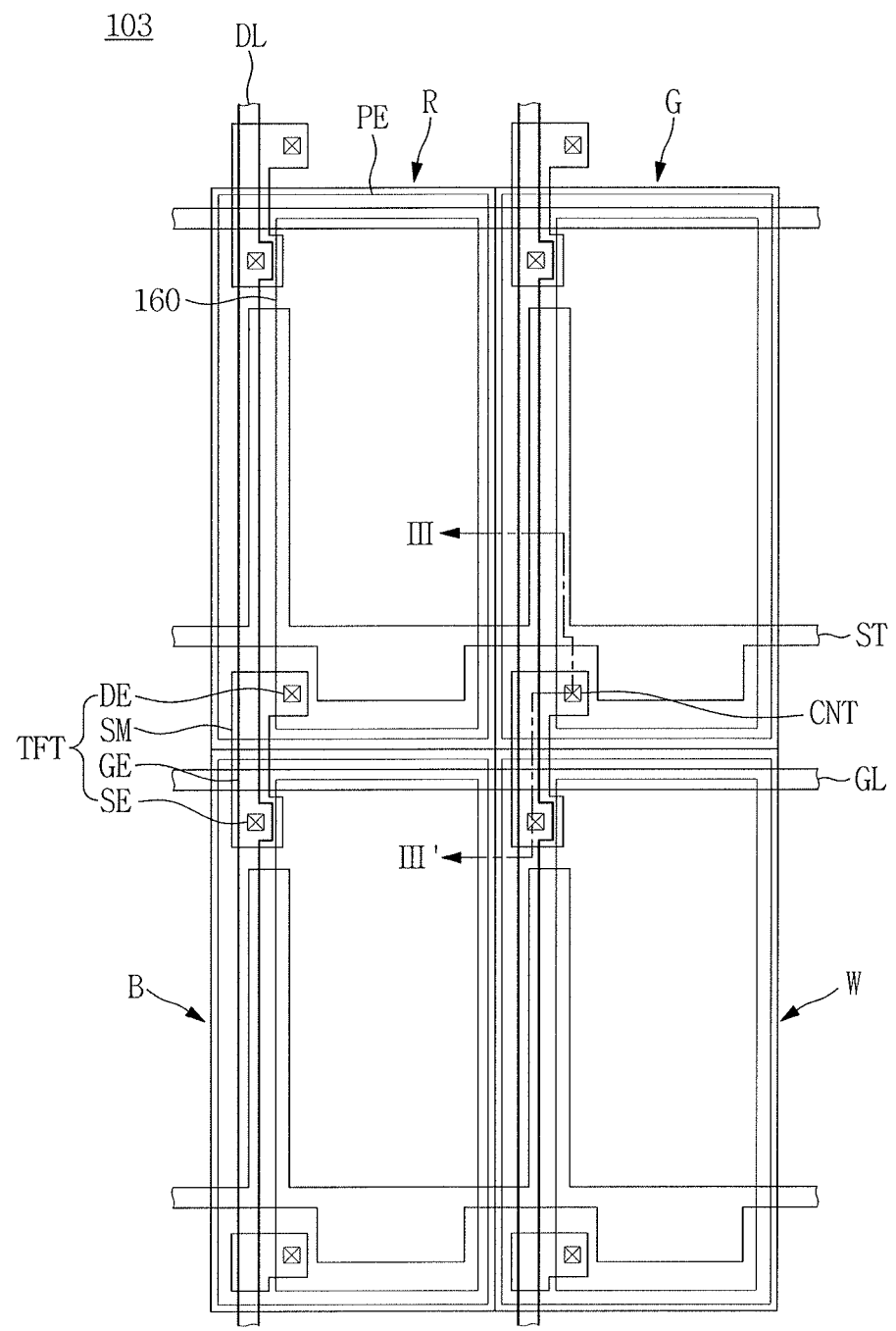
FIG. 9 illustrates an embodiment of an LCD device.
Figure 10A:
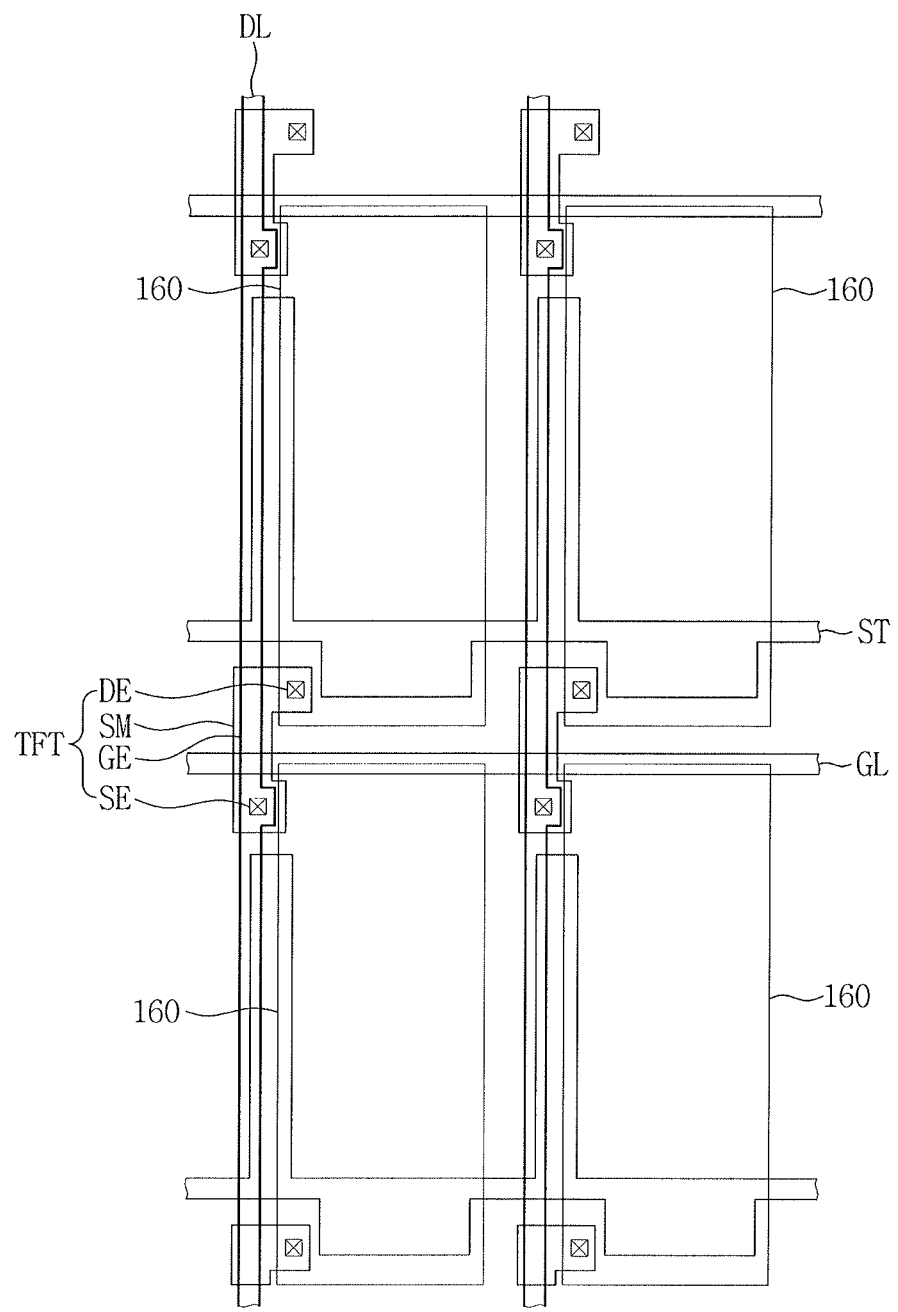
FIG. 10A illustrates an embodiment of a reflection layer and a wiring unit in FIG. 9.
Figure 10B:
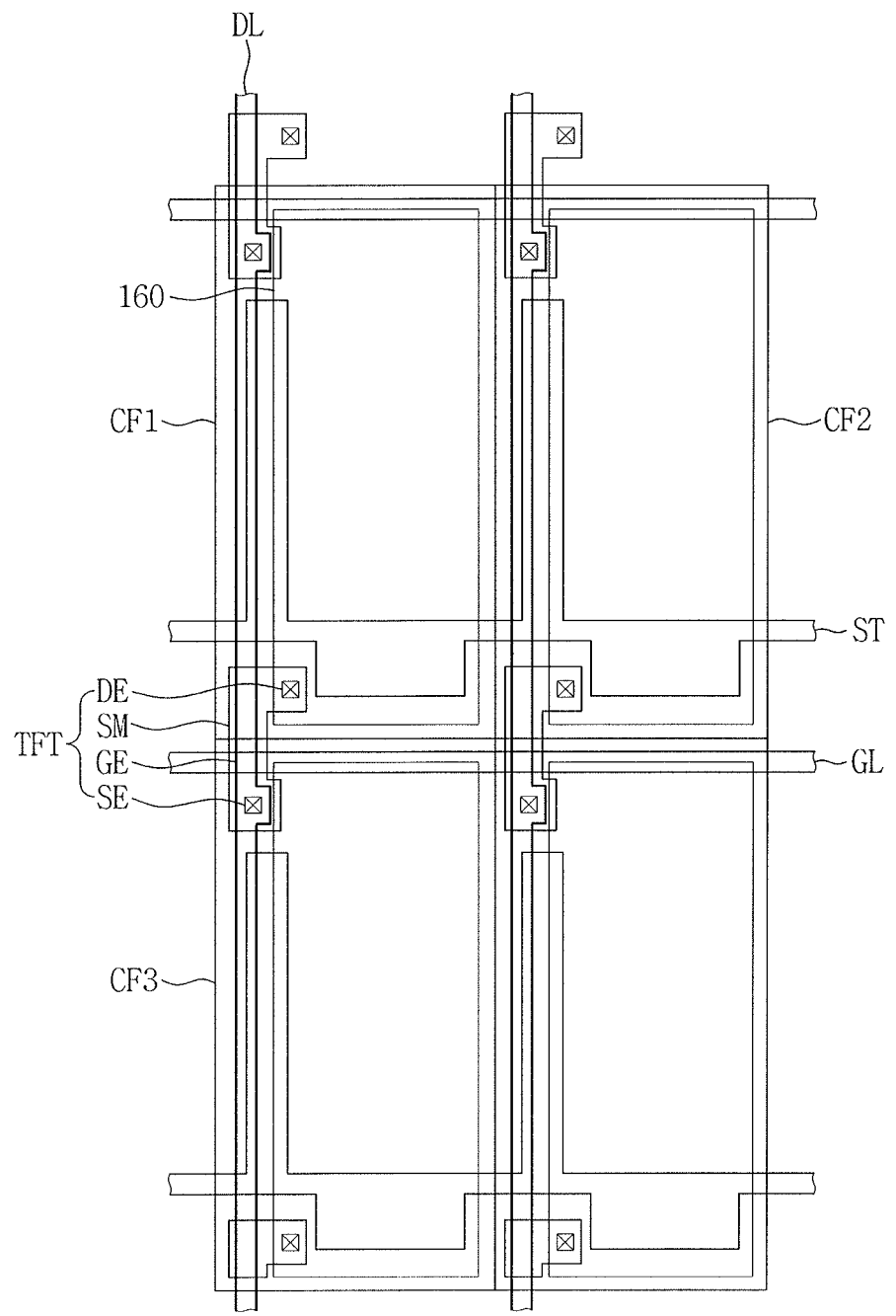
FIG. 10B illustrates an embodiment of the reflection layer, the wiring unit, and a color filter in FIG. 9.
Figure 10C:
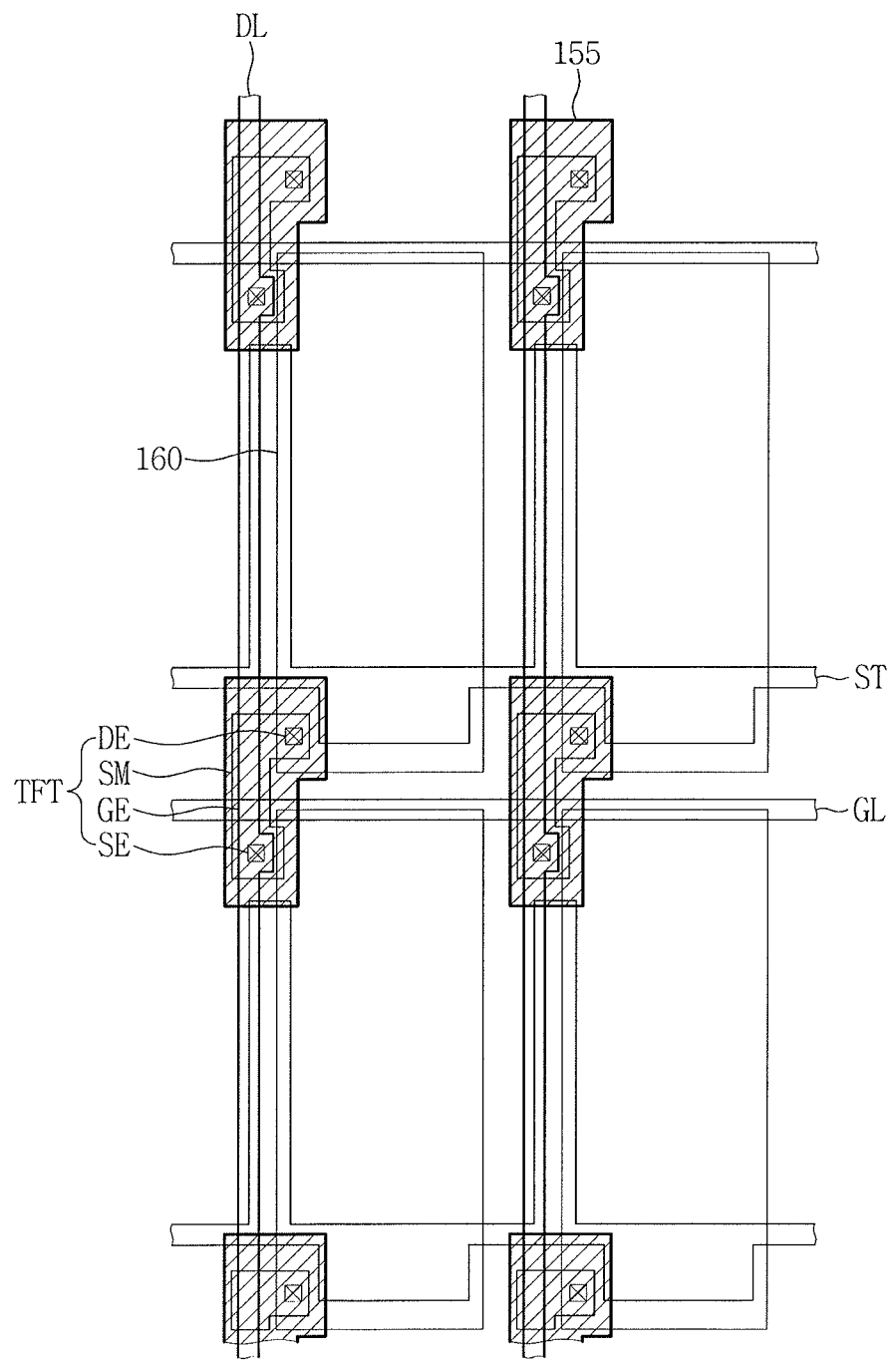
FIG. 10C illustrates an embodiment of a light blocking layer and a column spacer.
Figure 10D:
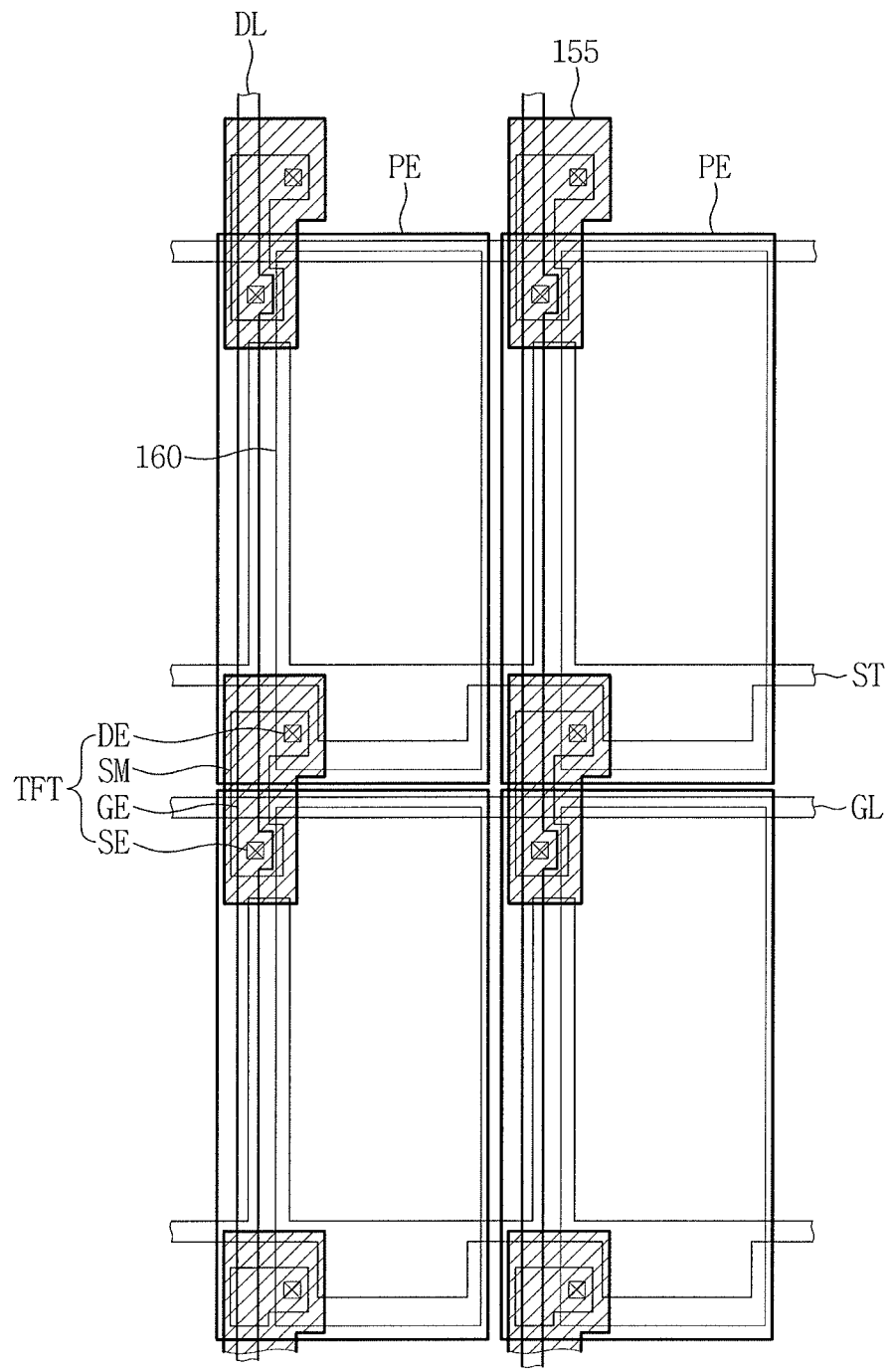
FIG. 10D illustrates an embodiment of a reflection layer, the wiring unit, and a pixel electrode in FIG. 9.
Figure 11:
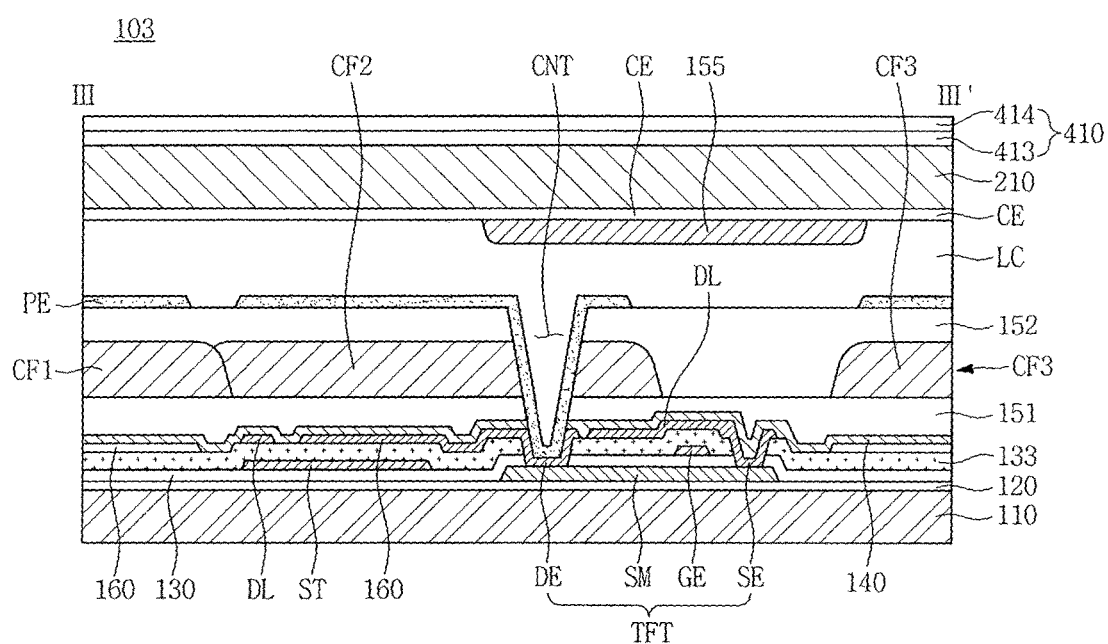
FIG. 11 illustrates a cross-sectional view taken along line III-III' in FIG. 9.

FIG. 9 is a plan view illustrating another embodiment of an LCD device 103. FIG. 10A is a plan view illustrating an embodiment of a disposition of a reflection layer and a wiring unit in FIG. 9. FIG. 10B is a plan view illustrating an embodiment of a disposition of the reflection layer, the wiring unit, and a color filter in FIG. 9. FIG. 10C is a plan view illustrating an embodiment of a disposition of a light blocking layer and a column spacer. FIG. 10D is a plan view illustrating an embodiment of a disposition of the reflection layer, the wiring unit, and a pixel electrode in FIG. 9. FIG. 11 is a cross-sectional view taken along line III-III' in FIG. 9.

The LCD device 103 includes a first substrate 110, a second substrate 210 opposing the first substrate 110, a liquid crystal layer LC between the first substrate 110 and the second substrate 210, and a polarization plate 410 on the second substrate 210. A buffer layer 120 is on the first substrate 110. In one embodiment, the buffer layer 120 may be omitted.

A semiconductor layer SM is on the buffer layer 120. A gate insulating layer 130 is on the semiconductor layer SM and may be disposed over an entire surface of the first substrate 110. A gate electrode GE is on the gate insulating layer 130. Referring to FIGS. 9 and 10A, a portion of the gate line GL corresponds to the gate electrode GE.

A storage electrode ST is on the gate insulating layer 130 and partially overlaps the reflection layer 160 to form a storage capacitor. The storage electrode ST receives a storage voltage. The storage electrode ST is on a different layer from the reflection layer 160 and, in a plan view, may be between the reflection layer 160 and the data line DL.

An insulating interlayer 133 is on the gate electrode GE, the gate line GL, and the storage electrode ST. The data line DL, a source electrode SE, and the reflection layer 160 are on the insulating interlayer 133. The source electrode SE extends from the data line DL. A portion of the reflection layer 160 is connected to the semiconductor layer SM through a contact hole in the insulating interlayer 133 to serve as a drain electrode DE. The drain electrode DE is electrically connected to a pixel electrode PE through a contact hole CNT.

The source electrode SE and the drain electrode DE are spaced apart from each other. Each of the source electrode SE and the drain electrode DE overlaps a portion of the semiconductor layer SM. The gate electrode GE, the semiconductor layer SM, the source electrode SE, and the drain electrode DE collectively define a TFT.

In one embodiment, the data line DL, the source electrode SE, the drain electrode DE, and the reflection layer 160 may include substantially a same material and, for example, may be formed in substantially a same process. Accordingly, an additional process is unnecessary for purposes of forming of the reflection layer 160.

The reflection layer 160 is in an area overlapping at least a portion of the pixel electrode PE. In the present embodiment, the reflection layer 160 is spaced apart from the data line DL and overlaps the gate line GL and the storage electrode ST. Referring to FIG. 10A, the reflection layer 160 has an island-shaped pattern and is provided corresponding to each pixel. The reflection layer 160 may have a different shaped pattern in another embodiment.

The reflection layer 160 is connected to the TFT in the present embodiment.

A passivation layer 140 is on the data line DL, the source electrode SE, and the reflection layer 160. A first protection layer 151 is on the passivation layer 140. In one embodiment, the passivation layer 140 or the first protection layer 151 may be omitted.

A color filter layer CF is on the first protection layer 151 and may include a first color filter CF1, a second color filter CF2, and a third color filter CF3. The first color filter CF1, the second color filter CF2, and the third color filter CF3 have different colors, e.g., may be red, green, and blue color filters.

In one embodiment, the LCD device 103 includes a white pixel W. In one embodiment, a color filter may be absent above a portion of the reflection layer 160 corresponding to the white pixel W. In one embodiment, a white color filter may be in the white pixel W.

The data line DL, the gate line GL, and the storage electrode ST may reflect light along with the reflection layer 160. Referring to FIG. 10A, the data line DL, the gate line GL, and the storage electrode ST are exposed, do not overlap the reflection layer 160, and thus may serve substantially a same role as the reflection layer 160.

Referring to FIG. 10A, a non-reflection area NR is between the data line DL and the reflection layer 160, and two different color filters overlap each other in the non-reflection area NR. The non-reflection area NR between the data line DL and the reflection layer 160 is a portion of a slit portion in the reflection layer 160.

A second protection layer 152 is on the color filter layer CF. The pixel electrode PE is on the second protection layer 152. Referring to FIG. 10D, the pixel electrode PE is on the reflection layer 160, the data line DL, the gate line GL, and the storage electrode ST which perform a light reflection function. The pixel electrode PE is electrically connected to the reflection layer 160 through the contact hole CNT.

The second substrate 210 opposes the first substrate 110, and the liquid crystal layer LC is between the first substrate 110 and the second substrate 210. A common electrode CE is on the second substrate 210.

A light blocking layer 155 is on the second substrate 210 and may not be in or overlap an area including the reflection layer 160, the data line DL, the gate line GL, and the storage electrode ST which perform a light reflection function. In one embodiment, the light blocking layer 155 may be in an area except for at least one of the reflection layer 160, the data line DL, or the storage electrode ST.

Referring to FIG. 10C, the light blocking layer 155 is on the TFT. As such, color mixture (that may otherwise occur due to overlap of the color filters) may be effectively reduced or prevented while significantly reducing or minimizing the size of the light blocking layer 155. As a result, the LCD device 103 may have an excellent aperture ratio and may display an image of high resolution.

Figure 12:
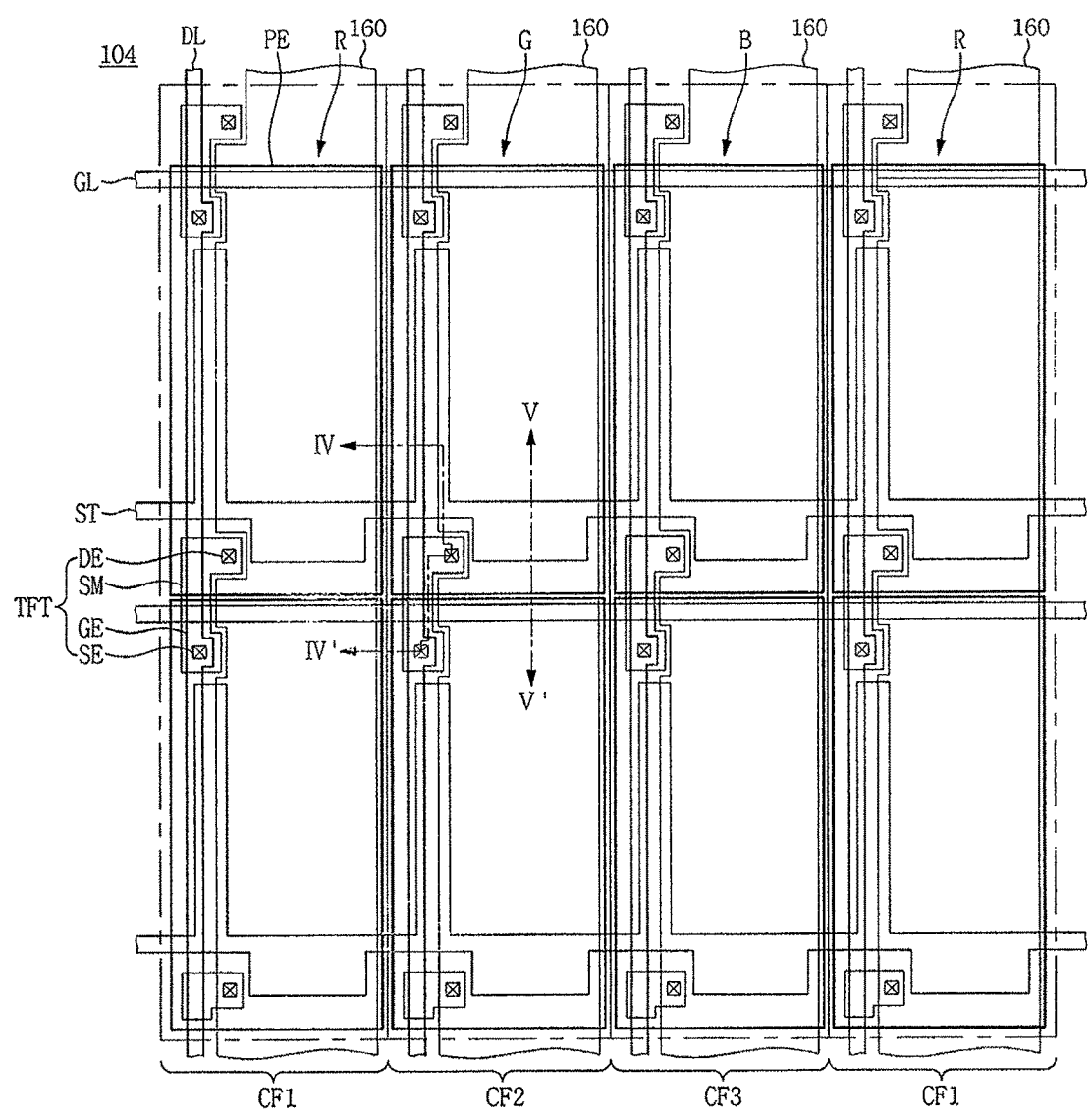
FIG. 12 illustrates an embodiment of an LCD device.
Figure 13A:
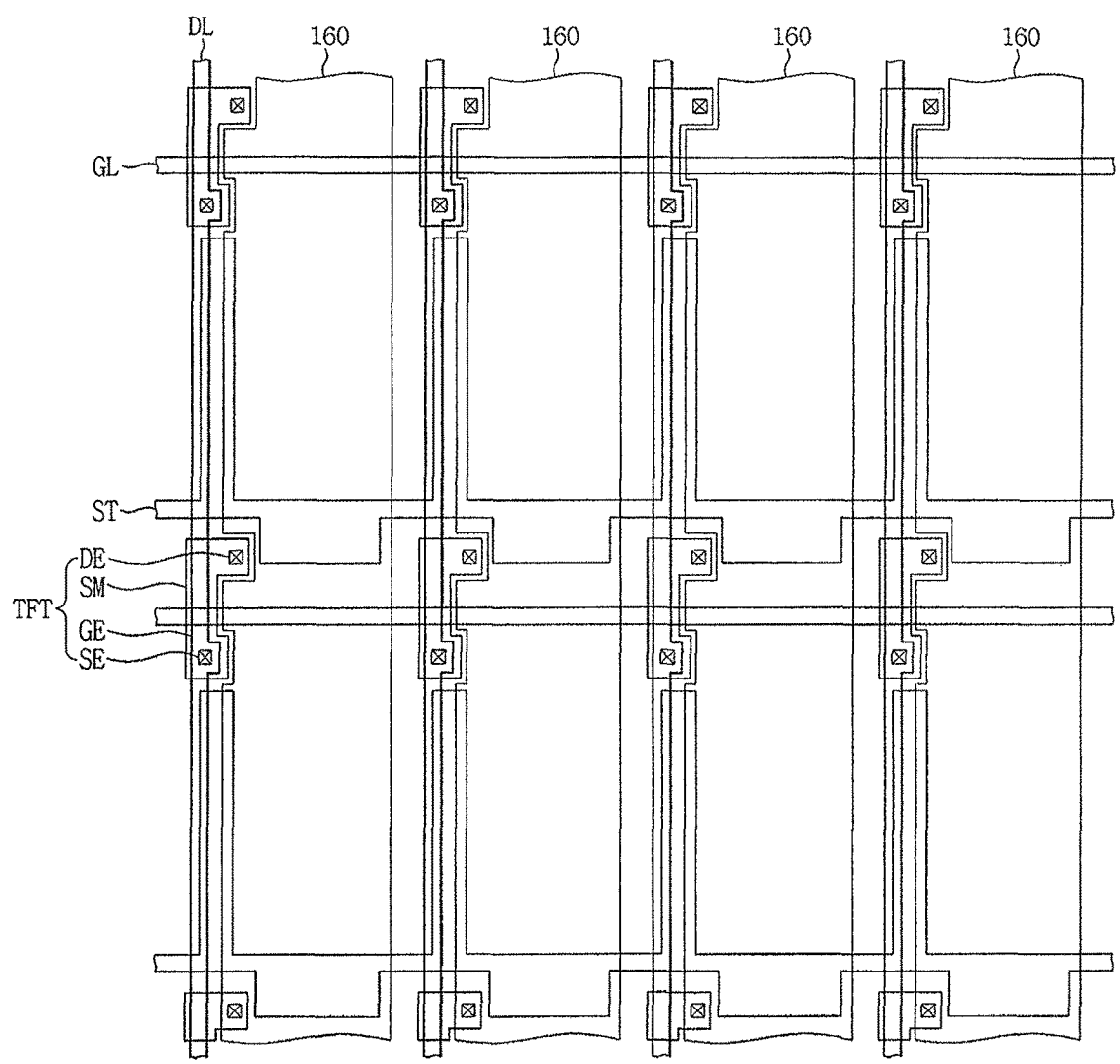
FIG. 13A illustrates an embodiment of a reflection layer and a wiring unit in FIG. 12.
Figure 13B:
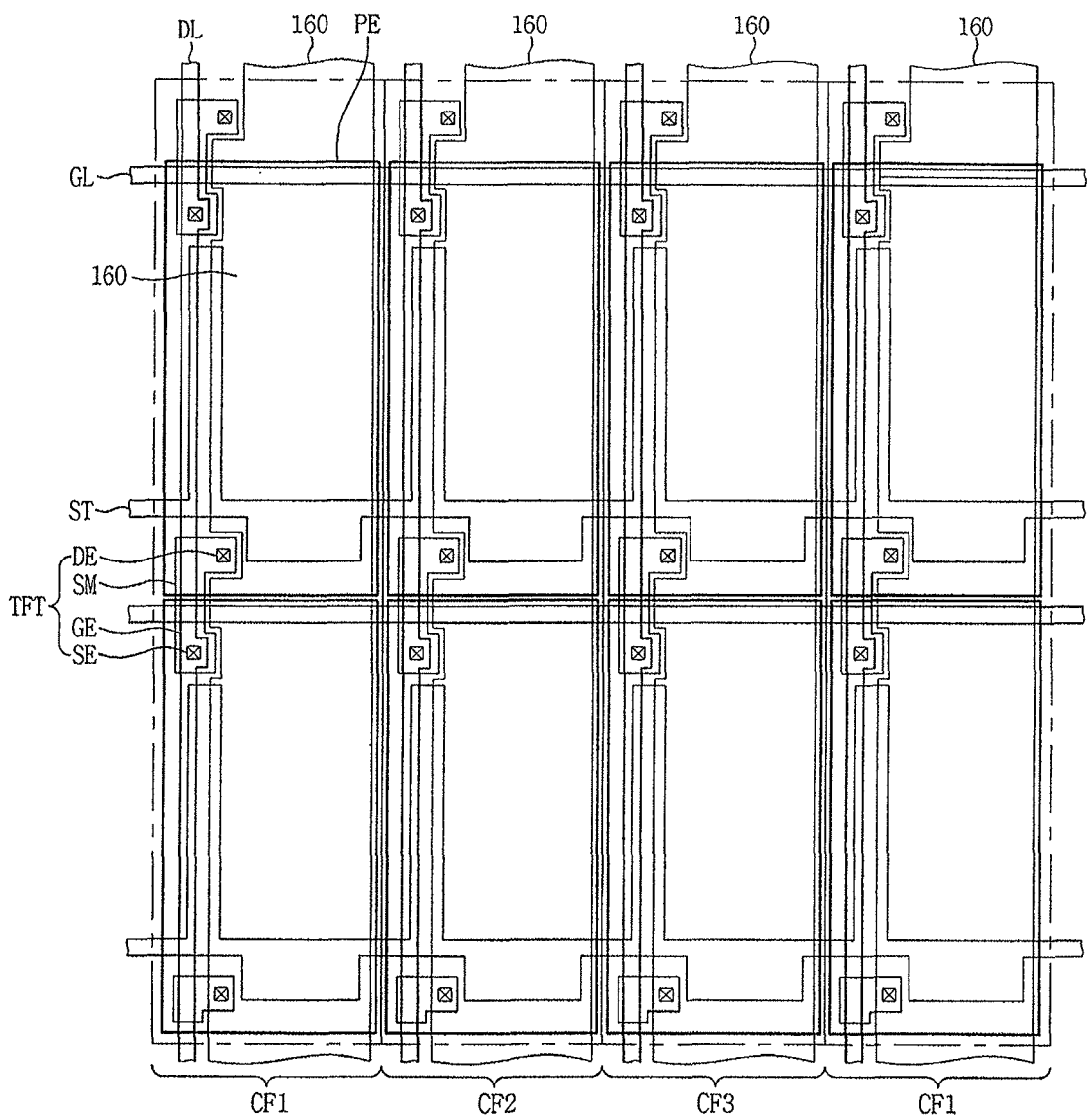
FIG. 13B illustrates an embodiment of the reflection layer, the wiring unit, and a color filter in FIG. 12.
Figure 13C:
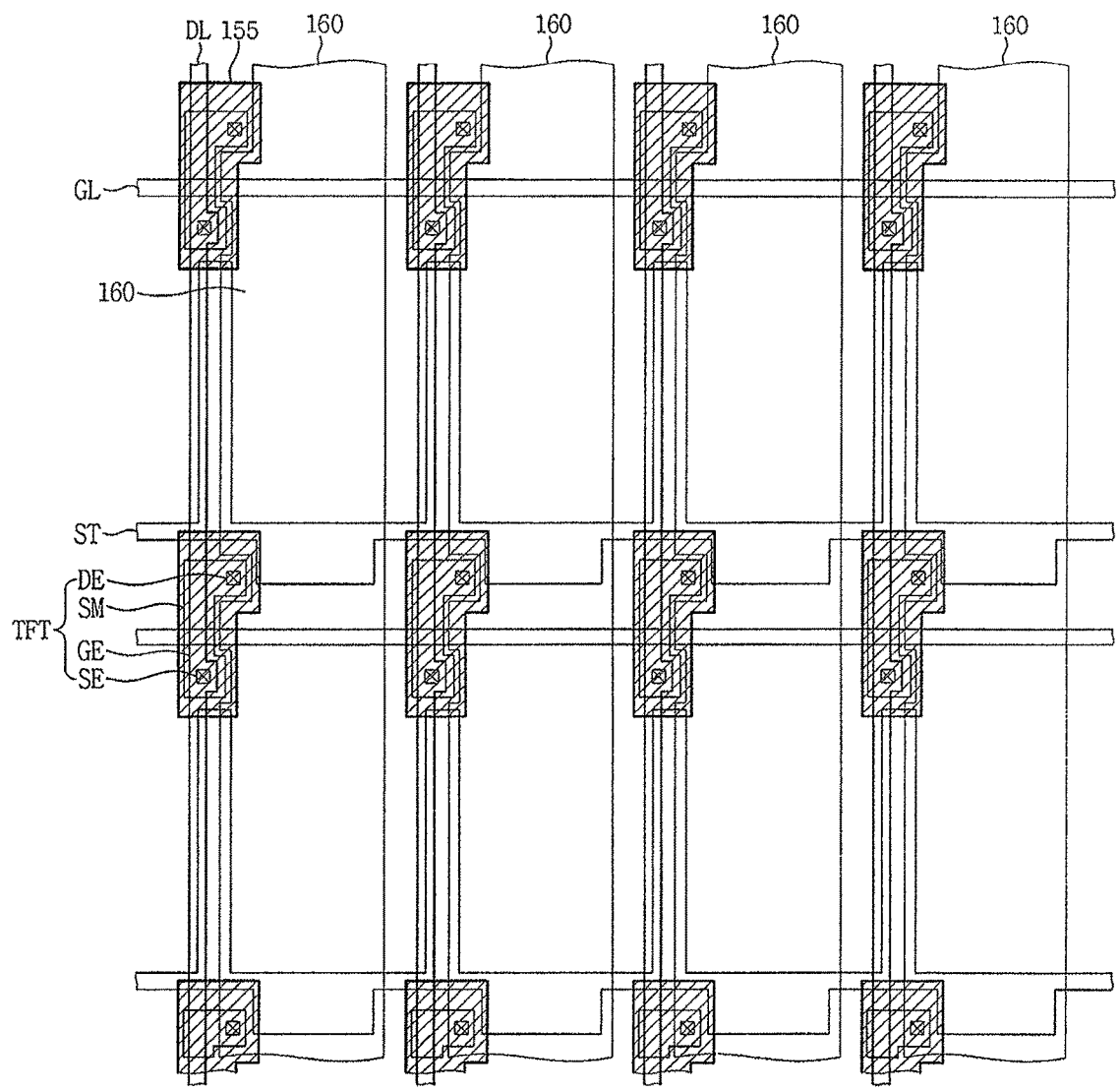
FIG. 13C illustrates an embedment of a light blocking layer and a column spacer.
Figure 13D:
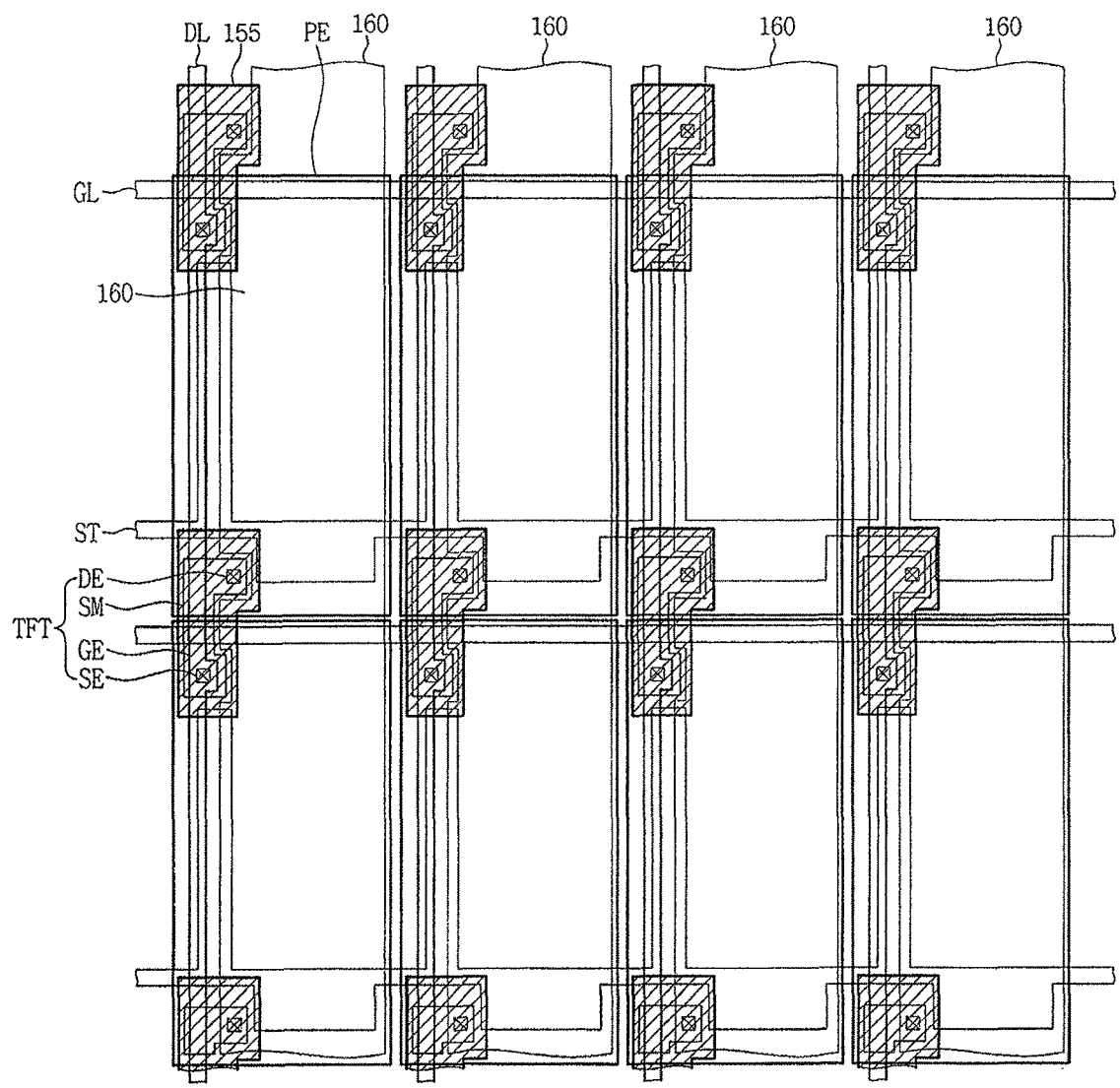
FIG. 13D illustrates an embodiment of the reflection layer, the wiring unit, and a pixel electrode in FIG. 12.

FIG. 12 is a plan view illustrating another embodiment of an LCD device 104. FIG. 13A is a plan view illustrating an embodiment of a disposition of a reflection layer and a wiring unit in FIG. 12. FIG. 13B is a plan view illustrating an embodiment of a disposition of the reflection layer, the wiring unit, and a color filter in FIG. 12. FIG. 13C is a plan view illustrating another embodiment of a disposition of a light blocking layer and a column spacer. FIG. 13D is a plan view illustrating an embodiment of a disposition of the reflection layer, the wiring unit, and a pixel electrode in FIG. 12.

Figure 14:
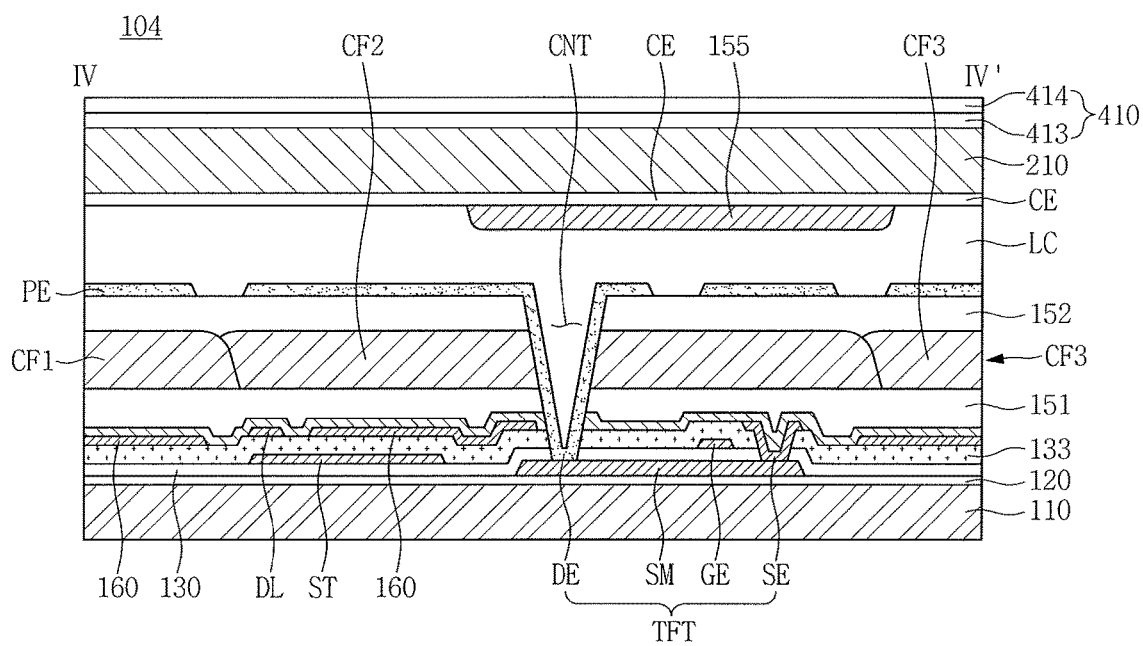
FIG. 14 illustrates a cross-sectional view taken along line IV-IV' in FIG. 12.
Figure 15:
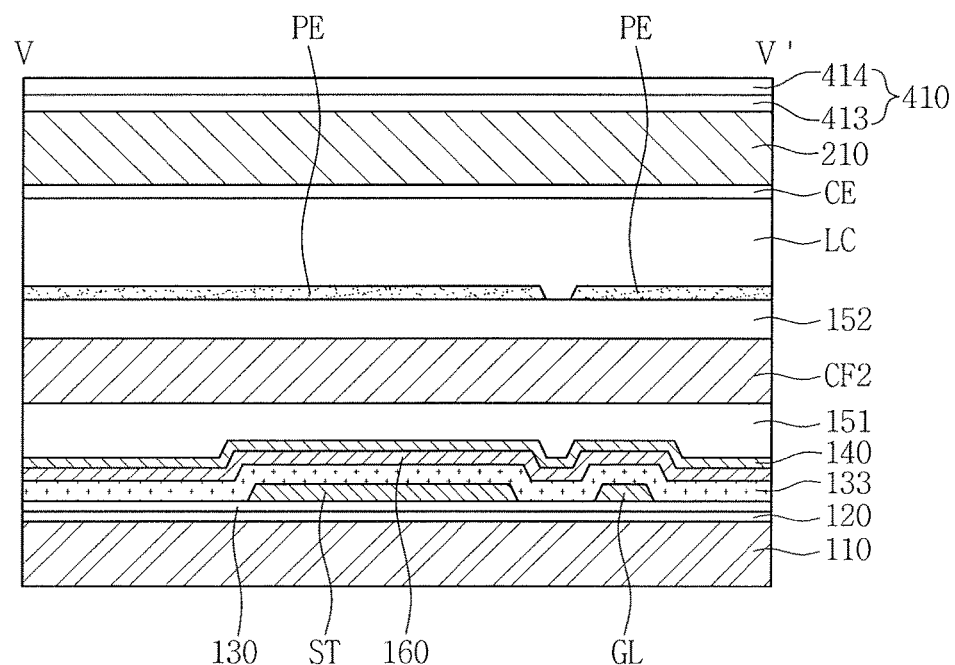
FIG. 15 illustrates a cross-sectional view taken along line V-V' in FIG. 12.

FIG. 14 is a cross-sectional view taken along line IV-IV' in FIG. 12, and FIG. 15 is a cross-sectional view taken along line V-V' in FIG. 12. Referring to FIGS. 14 and 15, the LCD device 104 includes a reflection layer 160 spaced apart from the data line DL. A slit portion may correspond to the reflection layer 160 and the data line DL, but may not correspond to the gate line GL. Referring to FIG. 13A, the reflection layer 160 has a linear pattern that extends along the data line DL and is spaced apart from data line DL.

The data line DL, a source electrode SE, and the reflection layer 160 may include substantially a same material and, for example, may be provided in substantially a same process. Accordingly, an additional process is unnecessary to form the reflection layer 160. In addition, the reflection layer 160 is not connected to a TFT and, for example, may be connected to a ground or reference electrode.

Referring to FIGS. 12, 14, and 15, color filters CF1, CF2, and CF3 are on the reflection layer 160. Each of the color filters CF1, CF2, and CF3 is disposed continuously along the data line DL. Referring to FIGS. 13B and 15, the color filters CF1, CF2, and CF3 have a linear pattern that extends along the data line DL.

Figure 16:
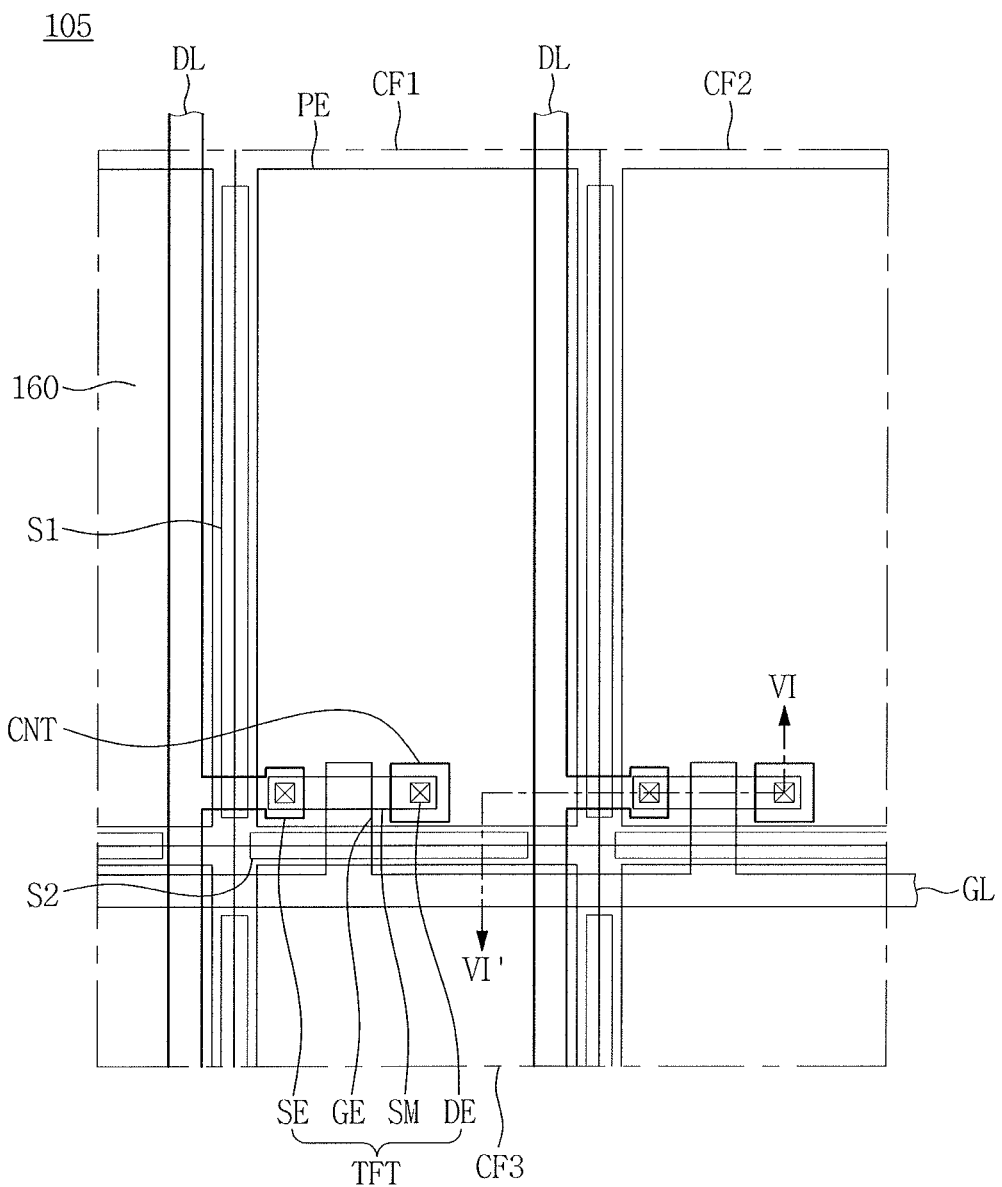
FIG. 16 illustrates an embodiment of an LCD device.
Figure 17:
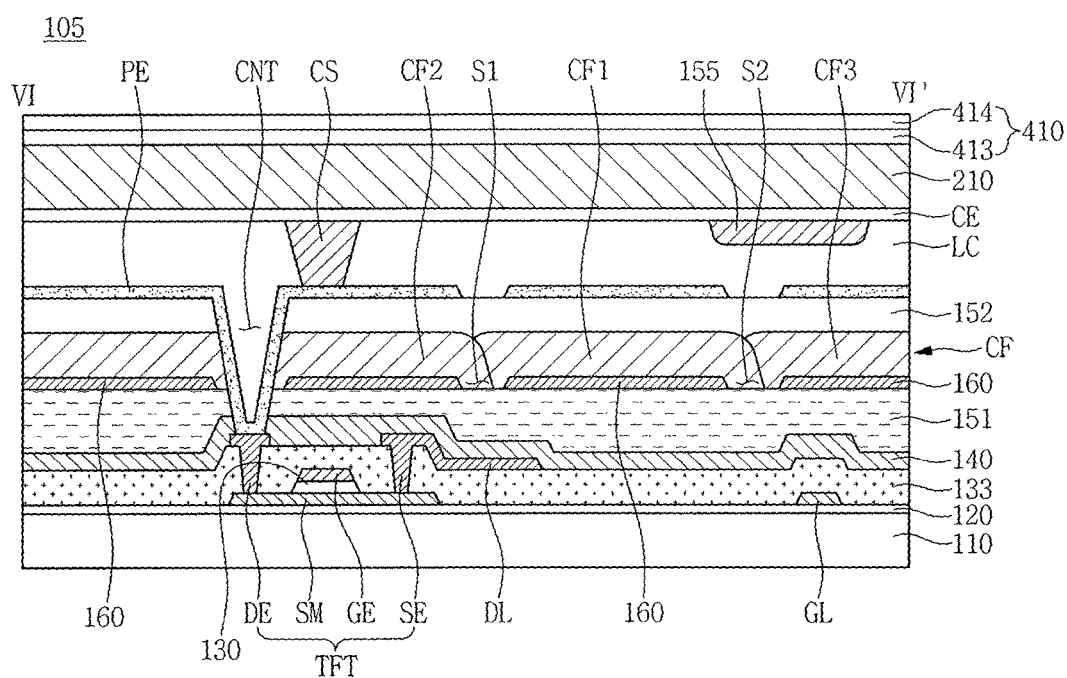
FIG. 17 illustrates a cross-sectional view taken along line VI-VI' in FIG. 16.

FIG. 16 is a plan view illustrating another embodiment of an LCD device 105, and FIG. 17 is a cross-sectional view taken along line VI-VI' in FIG. 16. Referring to FIG. 16, the LCD device 105 has substantially a same structure as LCD device 101, except that the first slit portion S1 is on the right side of a data line DL and the second slit portion S2 is above a gate line GL. Color filters CF1, CF2, and CF3 overlap one another on the right side of the data line DL and above the gate line GL. The first slit portion S1 and the second slit portion S2 may be at other locations in other embodiments.

Figure 18:
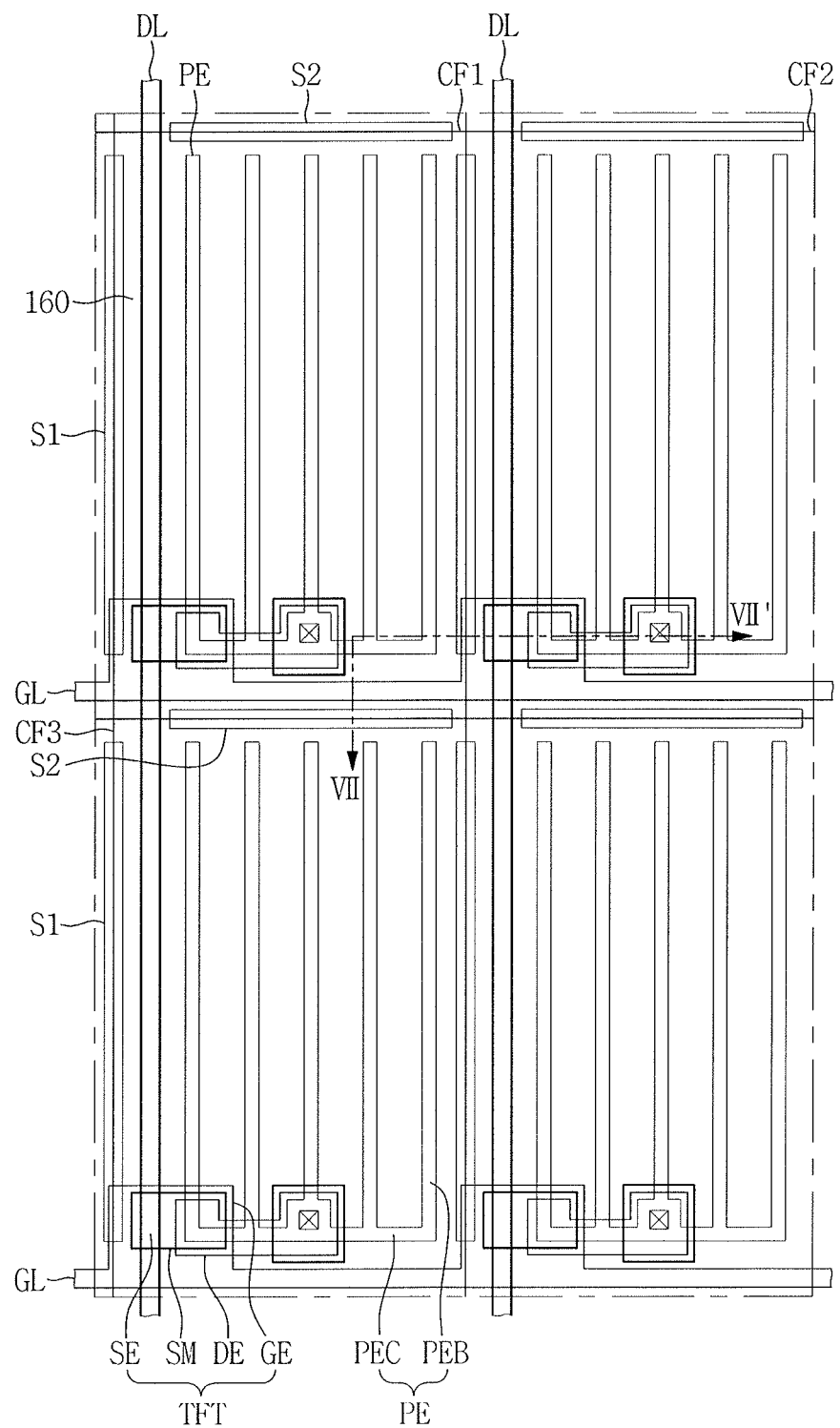
FIG. 18 illustrates an embodiment of an LCD device.
Figure 19:
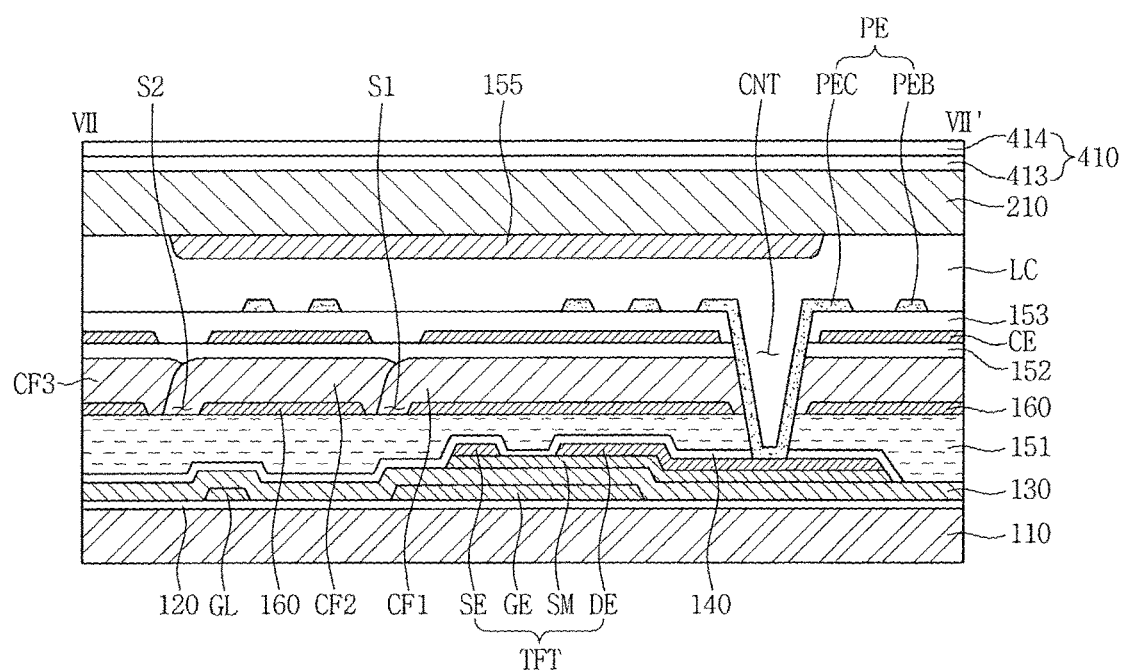
FIG. 19 illustrates a cross-sectional view taken along line VII-VII' in FIG. 18.

FIG. 18 is a plan view illustrating another embodiment of an LCD device 106, and FIG. 19 is a cross-sectional view taken along line VII-VII' in FIG. 18. The LCD device 106 includes a common electrode CE and a pixel electrode PE on a first substrate 110. For example, referring to FIGS. 18 and 19, a buffer layer 120 is on the first substrate 110, a TFT is on the buffer layer 120, a passivation layer 140 is on the TFT, a first protection layer 151 is on the passivation layer 140, and a reflection layer 160 is on the first protection layer 151.

The reflection layer 160 is insulated from the TFT and is in an area except for an area of the contact hole CNT. The reflection layer 160 has slit portions, e.g., a first slit portion S1 and a second slit portion S2. The first slit portion S1 is parallel and adjacent to the data line DL. The second slit portion S2 is parallel and adjacent to gate line GL.

Color filters CF1, CF2, and CF3 are on the reflection layer 160. An edge portion between two different color filters overlaps the slit portion, e.g., the first slit portion S1 and the second slit portion S2. A second protection layer 152 is on the color filters CF1, CF2, and CF3.

In the present embodiment, a common electrode CE is on the second protection layer 152. The common electrode CE opposes the pixel electrode PE, includes a TCO (e.g., ITO, IZO, and AZO), and overlaps the reflection layer 160. The common electrode CE is insulated from the TFT, and is provided in an area, except an area of contact hole CNT and an area corresponding to the first and second slit portions S1 and S2. In one embodiment, the common electrode CE may be in an area corresponding to the first and second slit portions S1 and S2. In one embodiment, the common electrode CE may be connected to a common voltage application line and may receive a common voltage from the common voltage application line.

A third protection layer 153 is on the common electrode CE, includes an insulating material, and may include substantially a same material as the second protection layer 152.

A pixel electrode PE is on the third protection layer 153 and is connected to a drain electrode DE of the TFT through the contact hole CNT that passes through the passivation layer 140, the first protection layer 151, the color filter, the second protection layer 152, and the third protection layer 153.

Referring to FIG. 18, the pixel electrode PE includes a connecting electrode PEC extending from the contact hole CNT along the gate line in a transverse direction of the drawing, and a plurality of branch electrodes PEB extending from the connecting electrode PEC. An electric field formed between the branch electrode PEB and the common electrode CE drives liquid crystals to form an image.

A second substrate 210 opposes the first substrate 110, and a liquid crystal layer LC is between the first substrate 110 and the second substrate 210. A light blocking layer 155 may be on the second substrate 210.

According to one or more exemplary embodiments, a reflective LCD device may prevent color mixture at an edge portion among color filters. In addition, a reflective LCD device is provided with a high aperture ratio because a light blocking layer with relatively small width is provided at the edge portion among the color filters or the light blocking layer is not provided. Also, a reflective liquid crystal display device is provided with a high aperture ratio and effectively reduces (or prevents) color mixture. Further, a reflective LCD device may generate a high resolution image.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. A liquid crystal display device, comprising:
a first substrate opposing a second substrate;
a reflection layer on the first substrate;
a color filter layer on the reflection layer; and
a pixel electrode on the color filter layer, wherein the color filter layer includes a first color filter and a second color filter adjacent to the first color filter, wherein the reflection layer includes a slit portion overlapping an edge portion between the first color filter and the second color filter, and wherein a length of the slit portion is less than a width of the pixel electrode in a longitudinal direction of the slit portion.

2. The device as claimed in claim 1, further comprising:
a data line on the first substrate,
wherein the data line does not overlap the slit portion.

3. The device as claimed in claim 2, wherein the data line overlaps the reflection layer.

4. The device as claimed in claim 2, further comprising:
a gate line on the first substrate and intersecting the data line,
wherein the gate line does not overlap the slit portion.

5. The device as claimed in claim 4, wherein the slit portion includes:
a first slit portion along the data line and adjacent to the data line; and
a second slit portion along the gate line and adjacent to the gate line.

6. The device as claimed in claim 5, further comprising:
a light blocking layer on the second slit portion.

7. The device as claimed in claim 6, wherein the light blocking layer does not overlap the first slit portion.

8. The device as claimed in claim 1, wherein the reflection layer is insulated from the pixel electrode.

9. The device as claimed in claim 1, wherein the reflection layer is connected to a terminal having a predetermined electric potential.

10. The device as claimed in claim 1, wherein the reflection layer is connected to a reference terminal.

11. The device as claimed in claim 1, further comprising:
a data line on the first substrate,
wherein the reflection layer is spaced apart from the data line and on a same layer as the data line.

12. The device as claimed in claim 11, wherein the reflection layer includes a same material as the data line.

13. The device as claimed in claim 12, wherein the reflection layer has an island-shaped pattern.

14. The device as claimed in claim 13, wherein the reflection layer is electrically connected to the pixel electrode.

15. The device as claimed in claim 13, further comprising:
a storage electrode on a different layer from the reflection layer,
wherein the storage electrode is between the reflection layer and the data line.

16. The device as claimed in claim 15, further comprising:
a light blocking layer corresponding to the reflection layer, the data line, and the storage electrode.

17. The device as claimed in claim 12, wherein the reflection layer has a linear pattern extending along and spaced apart from the data line.

18. The device as claimed in claim 17, wherein each of the first color filter and the second color filter has a linear pattern extending along the data line.

19. A liquid crystal display device, comprising:
a first substrate opposing a second substrate;
a data line on the first substrate;
a gate line on the first substrate and intersecting the data line;
a reflection layer overlapping the data line and the gate line, the reflection layer including a first slit portion parallel to the data line;
a color filter layer on the reflection layer; and
a pixel electrode on the color filter layer, wherein the color filter layer includes a first color filter and a second color filter adjacent to the first color filter and wherein an edge portion between the first color filter and the second color filter overlaps the first slit portion.

20. The device as claimed in claim 19, wherein the reflection layer is insulated from the pixel electrode.

21. A liquid crystal display device, comprising:
a first substrate opposing a second substrate;
a data line on the first substrate and extending along a first direction;
a gate line on the first substrate and extending along a second direction which intersects the first direction;
a reflection layer on a same layer as the data line and spaced apart from the data line;
a color filter layer on the reflection layer and the data line; and
a pixel electrode on the color filter layer, wherein the color filter layer includes a first color filter and a second color filter adjacent to the first color filter, and wherein an edge portion at which the first color filter and the second color filter directly contact each other is between the reflection layer and the data line.

22. The device of claim 5, wherein the reflection layer includes a connecting portion between the first slit portion and the second slit portion.

* * * * *